United States Patent [19]

Ladue

[11] Patent Number: 6,070,070
[45] Date of Patent: May 30, 2000

[54] METHOD AND APPARATUS FOR REMOTE TELEPHONY SWITCH CONTROL

[75] Inventor: Christoph Karl Ladue, Santa Cruz, Calif.

[73] Assignee: Aeris.net, San Jose, Calif.

[21] Appl. No.: 09/234,612

[22] Filed: Jan. 20, 1999

Related U.S. Application Data

[60] Provisional application No. 60/071,892, Jan. 20, 1998.

[51] Int. Cl.[7] .................................................. H04Q 7/00
[52] U.S. Cl. ........................... 455/419; 379/127; 379/220
[58] Field of Search .................................... 455/552, 419, 455/426, 553, 427, 422; 379/127, 115, 112, 121, 201, 207, 221, 220, 211, 212, 219, 269

[56] References Cited

U.S. PATENT DOCUMENTS

| | | | |
|---|---|---|---|
| 5,689,555 | 11/1997 | Sonnenberg | 379/220 |
| 5,696,816 | 12/1997 | Sonnenberg | 379/220 |
| 5,699,416 | 12/1997 | Atkins | 379/127 |

*Primary Examiner*—William Cumming
*Attorney, Agent, or Firm*—Blakely Sokoloff Taylor & Zafman, LLP

[57] ABSTRACT

A command, such as an application specific command, is communicated from a central host to a remote station via a cellular mobile radio network. The station may be a fixed or roaming device. The central host sends the command a network switch, such as an SS7 SSP, wherein the command comprises a mobile identification number (MIN) and an electronic serial number (ESN). The network switch queries an associated HLR database to locate the remote station, the query specifying the MIN and the ESN. If the HLR does not recognize the MIN/ESN combination, it so informs the network switch, as well as the VLR associated with the MSC serving a remote station identified by the ESN. In response to the notification from the HLR, the VLR removes any entry in its database relating to the ESN and updates its database with the new MIN/ESN combination transmitted by the HLR to the VLR. The VLR confirms with the HLR that it has taken these steps and then sends the command to the remote station by calling the station using the new MIN/ESN.

19 Claims, 17 Drawing Sheets

Fig. 8

| OPERATION: Qualification Directive | Timer: | QDT | |
|---|---|---|---|
| INVOKE PARAMETERS | | REFERENCE | TYPE |
| MobileIdentificationNumber 122 | | 8.2.6 | M |
| MobileSerialNumber | | 8.2.7 | M |
| QualificationInformationCode | | 8.2.15 | M |
| SystemMyTypeCode (DLR,HLR or VLR) 123 | | 8.2.21 | M |
| AuthorizationDenied | | 8.2.11 | O |
| AuthorizationPeriod | | 8.2.12 | O |
| OriginationIndicator | | 8.2.22 | O |
| Digits(or data destination) | | 8.2.19 | O |
| TerminationRestrictionCode 136 | | 8.2.23 | O |
| CallingFeaturesIndicator | | 8.2.24 | O |
| Digits (Carrier data) | | 8.2.19 | O |
| RETURN RESULT PARAMETERS | | REFERENCE | TYPE |
| EMPTY 014896953-3-33330 124 | | 8544003003 125 | 126 |
| RETURN ERROR CODE | | REFERENCE | |
| Error Code | | 8.1.1.3 | |
| RETURN ERROR PARAMETERS | | REFERENCE | TYPE |
| FaultyParameter | | 8.2.25 | O |

Fig. 9

| OPERATION: Qualification Request | TIMER: | QRT | |
|---|---|---|---|
| INVOKE PARAMETERS 127 | REFERENCE | | TYPE |
| MobileIdentificationNumber 122 | 8.2.6 | | M |
| MobileSerialNumber | 8.2.7 | | M |
| QualificationInformationCode | 8.2.15 | | M 137 |
| SystemMyTypeCode (DLR,HLR or VLR) 123 | 8.2.21 | | M 138 |
| AuthorizationDenied | 8.2.11 | | O |
| AuthorizationPeriod | 8.2.12 | | O |
| OriginationIndicator | 8.2.22 | | O |
| Digits(or data destination) | 8.2.19 | | O |
| TerminationRestrictionCode 136 | 8.2.23 | | O |
| CallingFeaturesIndicator | 8.2.24 | | O |
| Digits (Carrier data) | 8.2.19 | | O |
| RETURN RESULT PARAMETERS 124 | REFERENCE 125 | | TYPE 126 |
| EMPTY | | | |
| RETURN ERROR CODE | REFERENCE | | |
| Error Code | 8.1.1.3 | | |
| RETURN ERROR PARAMETERS | REFERENCE | | TYPE |
| FaultyParameter | 8.2.25 | | O |

METHOD AND APPARATUS FOR REMOTE TELEPHONY SWITCH CONTROL

This application claims the benefit of U.S. Provisional Application No. 60/071,892, filed Jan. 20, 1998.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates wireless Cellular, Personal Communications Systems (PCS), Mobile Satellite, and Low Earth Orbit (LEO), Mediumn Earth Orbit (MEO), High Earth Orbit (HEO), Ellipsoid Satellites, and Geosynchronous Satellite networks. Specifically the invention relates to enabling remote control of switching functions and ground station functions. The invention relates to, and utilizes, standard signaling system seven (SS7) networks and Internet networks. These networks are used to deliver specialized data communications protocols that enable unique control of telephony switch platforms and base site controller(s) (BSC) via specialized Maintenance Position (MAP) and Test Position (TP) algorithms. The invention manipulates these various functions of MAP and TP for the purpose of maximizing switch, BSC and satellite station network bandwidth. The invention enables forward mobile and stationary communication terminal paging, mobile terminal velocity tracking, optimum base site management, and other important maintenance and testing functions, controlled from a remote location.

2. Description of Related Art

There are numerous means, methods and apparatuses in the telecommunications art today that enable various remote maintenance procedural controls. However, the invention enables a completely innovative approach to manipulating conventional-standard Bellcore Maintenance Position (MAP) or Test Position (TP) command sets from a remote location. The invention provides the means and method for causing cellular, PCS and satellite ground station switches to; initiate, and trigger forward control channel pages, registrations, and forward application specific messages. In addition the invention provides for base site identification number retrieval, specific radio control channel forward pages, multi-gang telemetry unit pages, application specific command pages, anti-fraud mobile unit velocity tracking, mobile unit location approximation, specialized caller I.D. messages, and other such data event actions. Furthermore, the invention can cause specific forward analog and digital control and signaling channels to page mobile units and stationary that are operating in specific base site areas. Single base sites, base site groups, and entire cellular and PCS networks can be used to page a specific mobile or stationary communications unit or multiple units. The invention provides these flexible means and methods while simultaneously minimizing host network bandwidth usage. The invention also enables unique manipulation of PSTN, forward traffic and voice channels and forward cellular page delivery and call setup means and methods.

The invention manipulates conventional Maintenance Position and Test Position command sets, within typical UNIX and NT station Man Machine Interface (MMI) computer terminals. These terminals are typically used to program, monitor and run maintenance and test protocols within landline, cellular, PCS and satellite networks. These conventional maintenance and test protocols can cause specific base sites to page, run registration tests, and other such procedures from manual command sets initiated by network personnel. The invention provides unique software that is installed in designated terminals. Once the software is installed, the terminal is then connected to a host signaling system seven (SS7) network and/or an internet network. The invention provides for unique SS7 internet packet protocols which contain specialized terminal software command sets. These command sets are used to initialize maintenance and test positions from a remote location, such as a specialized SS7 IS-41 compatible service control point (SCP), or service switch point (SSP). Specific IS-41 automatic roaming data packet protocols such as, Registration Notification invokes, Registration Cancellation invokes, Qualification Directives and Qualification Requests can be manipulated to contain specialized MMI terminal command sets without circumventing the conventional intention of the operational standard. In addition, the invention provides specialized TCP/IP internet formatted packets that contain the same command set information. These unique packets also contain mobile identification numbers (MIN) that are used for the forward paging actions, and other host network command sets that cause specific heretofore mentioned actions to be initialized and completed. The invention provides MMI terminal software modifications, operational modifications without interfering with the conventional use of these terminals. Most conventional MMI Terminals are UNIX or NT based, and therefore has built-in multitasking features. The invention exploits their inherent multitasking features, so that host network personnel can still manually use the terminal while at the same time the terminals perform the inventions automatic functions. As such, these designated MMI terminals become a point-of-presence (POP) on a designated host SS7 network or internet network. Single MMI terminals, and cascaded groups of terminals embodied in Host Network Management Centers can be attached as single network nodes with global, cluster and node originating point codes (OPC) and destination point codes (DPC), that are recognizable as SS7 POPs.

The invention also provides for unique message usage's of SS7 signaling protocols that are embodied in Interim Standard (IS) 41A, 41B, 41C; Qualification Directive, Qualification Request, Registration Notifications, Registration Cancellation, Service Profile Directive, and Location/Routing Request Invokes.

SUMMARY OF THE INVENTION

To achieve the foregoing objects, and in accordance with the purposes of the invention as embodied and broadly described herein, a means and method of providing SS7 based, and Internet based primary and secondary mobile identification numbers (MIN) for forward analog, and digital control channel forward pages. Manipulated forward messaging channel data characters in the form of dual tone multiple frequency (DTMF), multifrequency (MF), and manipulated caller I.D. formats are also provided for. Both forward pages and data channel messages cause specialized trigger events to occur in application specific, wireless data communications devices. The communications devices are configured as stationary and mobile telemetry, application specific wireless data communicators. The application specific data communicators are specially designed to support such applications as: electrical and gas meter reading, security system status reporting, fire protection system status reporting, vending machine status reporting, mail drop box status reporting, motor vehicle tracking and location monitoring, automobile anti-theft and recovery, and many other related wireless data applications.

Furthermore, these application specific communicators are specially configured to recognize IS-54 TDMA, IS-136 TDMA and IS-95 CDMA analog control channel extended protocols. These extended protocols are uniquely used to transmit manipulated TIA TR-41.3.1 caller I.D. formatted messages to application specific communicators. Additionally, these extended protocols are used to transmit caller I.D. messages from application specific communicators. Contained within these caller I.D. digital formats are specially manipulated command and status response messages that are structured in hexadecimal, ASCII, and FSK manipulated data. Both forward and reverse messages are specially configured to 'look' like conventional caller I.D. messages, but are in fact uniquely and the conventional. The invention provides forward messages that 'look' like conventional 10 digit directory numbers, message waiting indicators and calling party 'names'. However these numbers are used to cause application specific communicators to complete an embedded software and firmware action to initialize and be completed.

The reception of these numbers can also cause the application specific communicator to transmit specialized status response messages. These messages can be formatted and sent in caller I.D. digital data or control channel analog data formats. Analog control channel data and caller I.D. data application specific messages can be sent and received as separate data events. Analog control channel data and digital caller I.D. data can be sent and received as combined application specific data events. Calling I.D. formatted 'calling party names' can be manipulated to cause application specific communicators to control and command attached and integrated devices such as global positioning system (GPS) receivers to report relative positions, motor vehicle engine status, cargo container position status and other status. These 'calling party name' messages can contain from 15 to 21 bytes of manipulated application specific data. Instead of the name, the message can contain from 15 to 21 bytes of action-command data.

A primary object of the invention is to provide multiple apparatus means comprising: a modified man-machine; Maintenance Position and Test Position interface (MMI) terminal(s). These computer terminals support the inventions unique Maintenance Position software. The software supports standard manually controlled Maintenance Position software, plus key algorithms and computer language protocols that interact with specialized SS7 based Transaction Capability Application Part (TCAP) protocols. These SS7 based TCAP protocols are controlled by a centralized IS-41A, B and C compatible Service Control Point (SCP) data management hub facility, that operates within the network architecture of conventional public and private IS-41 based SS7 networks. These networks are provided to maintain complete connectivity between cellular, PCS and mobile satellite mobile switching centers (MSC) and satellite network ground control stations. Each designated MMI terminal contains a special internal or external modem or PCM/CIA or dialogic card designed specifically to send and receive the inventions SS7/IS-41 based protocols. The card contains a special SS7 network node port that communicates with the MMI Maintenance Position computer terminal software, whereby received messages cause the terminal to activate an automatic Maintenance Position mode. This mode supports forward control channel paging, and/or forward messaging to be sent to a single designated or multiple set of mobile or stationary application specific data communicators. In addition, the Maintenance Position terminal is connected to a wireline or wireless telephony switch maintenance port, and interacts with switch fabric via computer machine language or other program formats such as UNIX or Windows NT.

In accordance with the invention, there is provided standard but modified IS-41 based SS7 data protocols: protocols such as Qualification Directives, Qualification Requests, Registration Notifications, Registration Cancellations, and Service Profile Directives. These SS7 based protocols normally support specific types of Service Control Point (SCP) and/or Service Switch Point (SSP) data information. The invention utilizes the conventional packet configuration, while at same time manipulating the existing data structures contained within; to cause an enabling of new Maintenance Position instruction sets. These instruction sets are transmitted from a specialized Service Control Point (SCP) data management hub to a designated MMI terminal that is an IS-41 SS7 node that has its own global, cluster and node based; originating point code (OPC) and destination point code (DPC).

In accordance with the invention, a specialized SCP manipulates and transmits a standard but modified Qualification Directive data packet to a designated Visitor Location Register (VLR) that is an associated network element with the currently serving MSC(s). Contained with this packet is a mobile identification number (MIN) and a Mobile Serial Number (MSN) and other data information, that is part of a comprehensive user roamer profile. Once the VLR receives the profile, it changes its data base user profile, to reflect the newly received information. If the SCP sends a new MIN number along with its MSN, the VLR enters the new MIN number into the designated user or application specific data communicator profile. This allows multiple forward pages to occur, utilizing multiple MINs, keyed to one MSN. This method creates a new use for forward pages, and in no way inhibits or causes any algorithmic conflict with normal stationary or mobile application specific communicator authentication. Once the VLR profile is updated the invention prepares another modified Qualification Directive data packet. This packet is sent to a designated MMI terminal, which is connected to an associated SSP wireless telephony switch maintenance port associated with the aforementioned VLR. The MMI contains the inventions specialized SS7 modem card, and Maintenance Position-multitasking software. Contained within this particular modified Qualification Direction are program instructions, and specific forward paging information such as the 10 character mobile identification number (MIN), and the eight character Mobile Serial Number (MSN). Once the MMI terminal receives the manipulated Qualification Directive, the MMI initializes its specialized Maintenance Position program, and causes the contained MIN to be forwarded from the MMI to the host wireless telephony switch to page a group or a single stationary or mobile application specific data communicator. This is accomplished without causing a public switched telephone network (PSTN) voice call pathway to be established, or other host network switch resources to be used that are normally required with a conventional voice call is placed within the framework of conventional PSTN network algorithms and elements.

It is an object of the invention to utilize IS-41 Registration Notification invokes and Registration Cancellation invokes in order to facilitate a unique means and method of utilizing multiple mobile identification numbers (MIN) with one application specific wireless communications device. This specially configured application specific device operates in a conventional cellular, PCS or mobile satellite wireless network. These networks are interconnected via the PSTN and public and private SS7 networks. The invention provides for an innovative integrated usage of PSTN network infrastructure, SS7 network infrastructure and cellular, PCS and mobile satellite switching platforms. The invention combines various conventional processes and procedures that enable the means and methods of delivering application specific commands and instructions to wireless devices operating in cellular, PCS and mobile satellite networks. For example the invention manipulates temporary location directory numbers (TLDN) in a unique way.

In conventional cellular networks a roaming mobile is assigned a TLDN when it accesses the currently serving cellular network. The TLDN is assigned to a roaming user, and entered into a user profile located in the associated VCRs internal data storage and processing structures. The TLDN is usually comprised with a local network assigned area code, and office code. When a roaming cellular user receives a land-to-mobile call the TLDN is used by the local telephone service provider to 'dial' the roaming mobile user. When the TLDN is received by the currently serving cellular network, its associated VLR causes the associated MSC to page the mobile with its permanently assigned MIN over the analog FOCC forward control channel. In the case of the invention's application specific communicator, the MIN is always comprised of an NPA or area code within the 100 to 199 number range.

The invention combines 10 digit TLDN numbers with non-dialable 100 to 199 NPA 10 digit numbers in a unique algorithmic protocol. This protocol enables an innovative means and method of delivering forward pages and forward messages to wireless application specific communicators that are operating in a cellular, PCS or mobile satellite network without incurring PSTN or wireless network airtime charges. The invention creates a completely secure means of delivering forward messaging, since the 100–199 series of MINs are not dilatable from the PSTN. The TLDN is not dialable from the PSTN either. Both numbers are only accessible from the SCP-HUB, and its special data base and data management means and methods.

The invention also utilizes and manipulates 'incomplete call' and 'page and no answer,' 'on-hook,' algorithms specified within the standards of IS-41, IS-553, IS-54B, IS-136, IS-95 compatible networks. These associated algorithms are manipulated for the purpose of enabling message/page call delivery (MPCD) to a wireless communicator without incurring currently serving PSTN, cellular, PCS and mobile satellite wireline and wireless network call duration charges. The invention's MPCD messaging method operates within all known national and international wireline and wireless telephony standards without causing disruption to conventional wireless and wireline voice and data services.

It is an object of the invention to provide internet data packet protocols that are used to send commands to MMI Maintenance Position terminals that have Internet based communication modem cards that are PCM/CIA based. These cards are ported to the world wide web (WWW). The specialized SCP-HUB also enables remote command and control of host mobile switching center (NSC) switches via the internet.

It is an object of the invention to provide innovative application specific communicator velocity tracking via unique creation of cell site identification and location, relative to the base sites stationary geographic location. The invention creates other unique functions and features by manipulating various Maintenance Position programs. Furthermore the invention manipulates switch maintenance port commands from a remote SCP-HUB location. The possibilities are endless.

It is an object of the invention to provide an application specific communicator that automatically differentiates between an A or B side cellular system within one cellular market. The invention utilizes specialized Number Plan Area (NPA) of area code numbers in completely innovative ways. Number ranges 100 to 199 are exclusively used by the present invention to provide application specific data communicators that automatically scan the associated cellular networks analog or digital control channels, and first attempt access to an A side cellular carrier or to a B side carrier. If access is denied first by one, then the communicator scans and attempts access with the other. The use of 100 to 199 NPAs uniquely enables this preferred embodiment. This scheme can also be used for accessing C block PCS carriers, and mobile satellite carriers.

The inventions wireless application specific communicator software and firmware means are specially configured to detect 'access allowed' or 'access denied' by monitoring specific call handling methods that are inherent in conventional cellular switch and base site radio channel management. The application specific communicator can be designed to 'listen' or detect 'route to tone or announcement' (RAN), or monitor supervisory auditory tone (SAT) durations transpiring on forward and reverse traffic channels during a data packet transmit event. SAT initiates at approximately the same time a call is engaged and ceases when a call is terminated either from the base site or communicator over a 'sub carrier' contained within the voice or traffic channels.

For example, if access is allowed, the associated MSC and base site only sustains seizure of a forward and reverse traffic or voice channel for a short duration such as 50 milliseconds to 1.8 seconds. If the associated MSC does not recognize the 100–199 series NPA when the communicator attempts access, it routes the 'call' to a stutter tone or announcement that is associated with that event. This RAN procedures takes from five to 30 seconds. The application specific communicator is specially configured to terminate the call if the reverse and forward voice channel is seized for over two seconds. This factor indicates to the communicator that it must attempt access with another cellular, or PCS, or mobile satellite network.

Another important object of the invention is to provide forward messaging in a cellular, PCS or mobile satellite via digital caller identification messaging (CID). The invention provides the means and method of sending a page message in the form of caller I.D. format, via the public switched telephone network (PSTN), land telephone network(s) (LTN) switch. The invention provides the means and method of delivering this same caller I.D. message to a specially modified application specific communicator that recognizes this CID message. The message contains specialized instruction commands. These commands are structured to emulate a ten digit directory phone number or a mobile identification number (MIN). Upon the reception of this number, the communicator activates its specialized software to modify operations of a connected device, and/or prepare a status response message to be transmitted to the SCP-HUB. The application specific communicator transmits this status response message to the associated cellular, PCS base site, or mobile satellite. This status response message can be formatted for caller I.D./PSTN access or SS7 network access. When the cellular or PCS base site or space-borne satellite receives the status message it relays it to the associated mobile switching center (MSC) or satellite network ground station (GS). When the MSC or GS receives the message, its translation databases analyze the data, and then send the message to the inventions SCP-HUB via an associated SS7 network.

The manipulation of the caller I.D. formats creates a unique protocol and transport mechanism for the transmission of application specific, forward command messages to be received by specially configured application specific wireless communicators. The application specific communicator can also transmit application specific status response messages to the inventions SCP-HUB by a currently serving cellular, PCS or mobile satellite network wireline and wireless infrastructure. The application specific communicator requests conventional remote feature access control or other related call services, and transmits the specially modified extended protocol message on the RECC analog control channel. The associated MSC analyses the received extended protocol message and forwards it to the SCP-HUB via caller I.D./PSTN network elements or the associated SS7 network elements.

The currently serving cellular, PCS or mobile satellite network receives the call message on the RECC control channel or other means. It then sets up a call to the designated PSTN node destination. The call is placed via PSTN network element means and the CID message is sent to the designated node. The node in this case is the inventions SCP-HUB. Once the CID message is sent, the application specific communicator automatically terminates the call. However, the application specific message contained in the manipulated caller I.D. formatted message has all ready been received. This preferred bi-directional messaging medium operates without incurring any land-line long distance charges, or cellular air time charges. The inventions modified and manipulated caller I.D. data operates bi-directionally via PSTN, cellular, PCS and mobile satellite networks without incurring any network air time or landline costs.

Another object of the invention provides for using extended protocols provided under the guidelines of IS-54, IS-136 TDMA and IS-95 CDMA digital air interface cellular network standards. These extended protocols operate bi-directionally on the forward and reverse analog control channels. These functions are especially valuable when an application specific communicator is operating in an IS-54, IS-136 or IS-95 dual mode analog/digital cellular network. The invention provides for a specially designed application specific communicator that has the firmware and software means to recognize extended protocol capability indicators (PCI) on the forward analog control channel (FOCC).

Conventional extended protocol provides for the delivery of caller I.D. messages. Message waiting indicators (MWI), and other data information to conventional dualmode TDMA and CDMA phones. These phones can operate via analog control channels, and analog voice channels. The invention provides for dual-mode application specific communications within a unique means and method. The communicator is configured to recognize dual mode FOCC extended protocols, and contained within these protocols are the inventions modified and manipulated caller I.D. formatted digital messages. The communicator is also configured to transmit specialized extended protocols over the RECC reverse analog control channels being utilized by these dual mode cellular networks. Contained in the RECC extended protocols are application specific messages formatted in caller I.D. digital data and other accepted formats.

The invention also provides for a unique usage of autonomous registration increment specified in Interim Standard 553. IS-553 is a specification that encompasses cellular mobile radio operations and cellular base site operations for the analog American Mobile Phone System (AMPS). In one scenario the invention provides the means and method of creating a message/page call delivery event (MPCD). A conventional mobile cellular radio is assigned and will recognize no more than two mobile identification numbers (MIN). When a conventional mobile cellular radio operates in a given cellular market or operational area, it never utilizes more than one MIN number. The invention provides the means and method of using multiple MIN numbers. The invention's application specific data communicator uses up to 20 MIN numbers, which include one primary and 19 secondary numbers. The secondary numbers are used solely for status reporting commands, internal programming changes, and application specific device control.

A connected application specific device such as a global positioning system (GPS) receiver, auto alarm, an electrical load control device or other such system can be controlled from the radio in this way. When the application specific radio receives a secondary MIN that causes a firmware and software based action to occur, the connected or integrated device can perform some operation that changes its 'state' or status. In one scenario the change in status needs to be reported. This status report is assembled in the form of an application specific message. The message is formatted for cellular control channel access, and sent through the currently serving cellular network where it is analyzed and relayed to the SCP-HUB via an associated SS7 network. The selected status message can be formatted in BCH block coding for analog control channels, or treated as digital caller I.D. format. For example this caller I.D. information can be contained in the aforementioned extended control channel protocol that provides caller I.D. information in its packet.

The communicator radio can also received another secondary MIN that causes the radio and its connected device to perform some directed function that does not require an immediate status report. In this scenario, the radio and its connected device can change its internal operation status, but a detailed status report is not transmitted to the SCP-HUB. The SCP-HUB network subsystem however needs a 'receipt' for this action. The invention provides the means and method of causing an autonomous registration to be transmitted from the application specific communicator. Contained in this autonomous registration is the secondary MIN that was just received. The autonomous registration packet typically contains the 10-digit MIN number and the eight character electronic serial number (ESN). Usually, the autonomous registration packet only contains the primary MIN number. In this case, the autonomous registration packet contains the secondary MIN that was just received, and caused a specific communicator firmware or software 'action' to occur. Once the specific action is completed, the radio transmits the autonomous registration packet to the currently serving cellular system base site and its associated control channel.

The cellular system receives the autonomous registration packet, analyses it, and relays it to the inventions SCP-HUB via an associated SS7 network. The SCP-HUB receives the packet, analyses the contained secondary MIN and thus verifies that the desired action as been complete. The receipt is recorded in the SCP-HUBs network system internal database structures. This 'receipt' action occurs in complete accord with current cellular operating standards, and in no way circumvents or comprises normal cellular and SS7 network operations.

Additional objects and advantages of the invention will be set forth in part by the description that follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of the specification, illustrate a preferred embodiment of the invention and, together with a general description given below and the detailed description of the preferred embodiments which follows, serve to explain the principles of the invention.

FIG. 8 is an illustration that depicts an SS7 IS-41 Qualification Directive data packet used uniquely by the RTSC system, according to the invention.

FIG. 9 is an illustration that depicts an SS7 IS-41 Qualification Request data packet used uniquely by the RTSC system. According to the invention.

DETAILED DESCRIPTION OF THE PREFERRED EMBODIMENTS OF THE INVENTION

Figure 1:
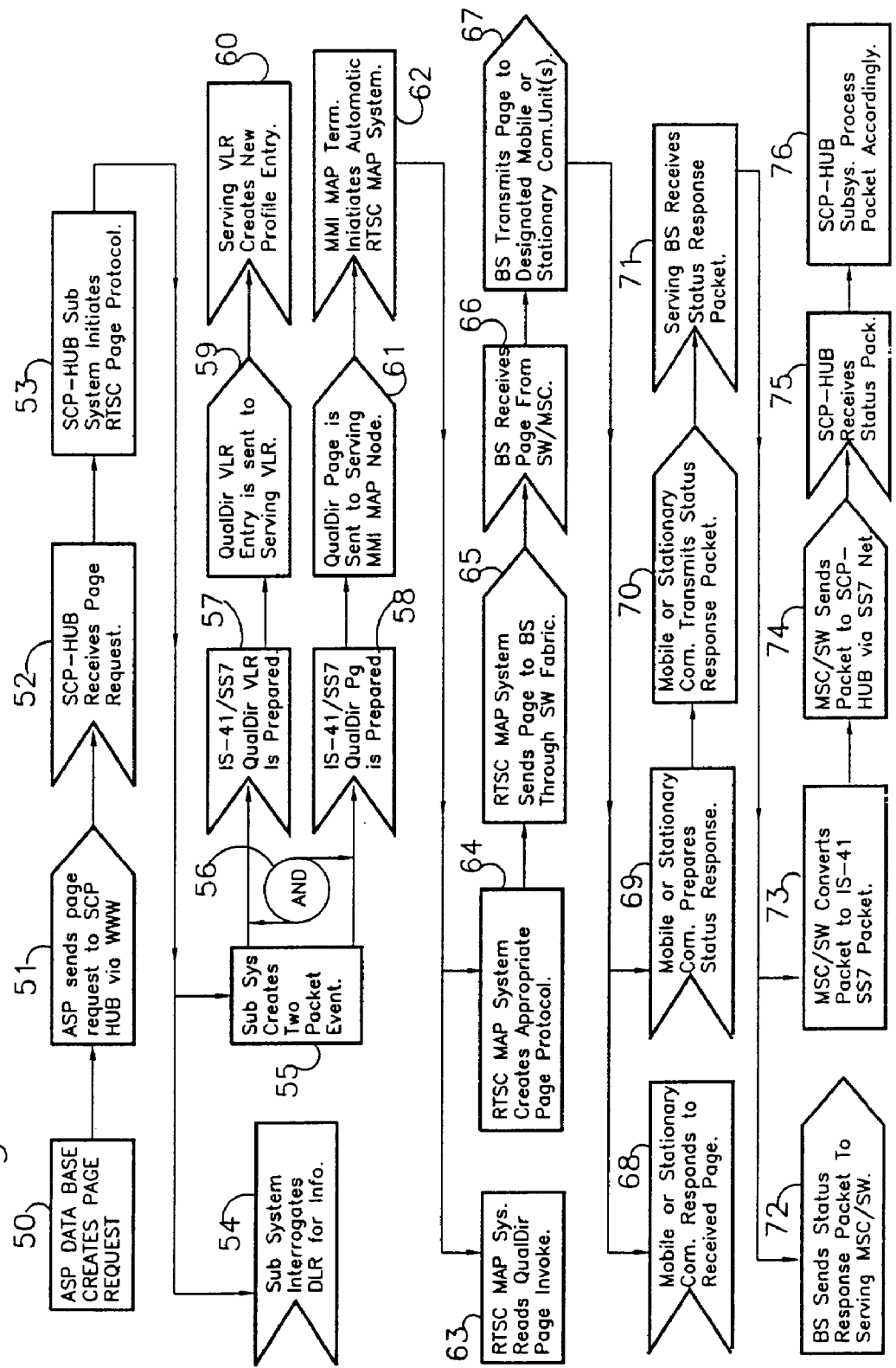
FIG. 1 is a logical block diagram showing the preferred embodiment of RTSC system protocol, according to the invention.

Reference will now be made in detail to the present preferred embodiments of the invention illustrated in the accompanying drawings. In describing the preferred embodiments and applications of the invention, specific terminology is employed for the sake of clarity. However, the invention is not intended to be limited to the specific terminology so selected, and it is understood that each specific element includes all technical equivalents, which operate in a similar manner to accomplish a similar purpose.

Accordingly, there is provided a method and apparatus for application specific wireless data, and wireline data communications that act in accord with the design of the inventions Remote Telephony System Control methods. Specialized data communications occur between a uniquely modified SS7 IS-41 compatible SCP-HUB, a modified MMI Maintenance Position computer terminal, which is co-located at a cellular, and, PCS mobile switching center (MSC), or multi MSC cellular carrier network management center. The MMI terminal is connected to switch fabric via a maintenance port or test port data link. The invention further provides modified SS7 IS-41 protocols, such as a specially formatted Qualification Directive data packet. Modified information contained within this packet serves two general functions. One, a modified Qualification Directive data packet is first sent to the currently serving MSC's associated visitor location register (VLR) via a switch fabric data link. This action causes a standard user profile to be modified by replacing the currently listed 10 digit mobile identification number (MIN) with up to 20 additional MINs, inserted one-at-a-time. This action is accomplished while maintaining consistent listings of the same eight-character Mobile Serial Number (MSN), also known as an Electronic Serial Number (ESN). Secondly, the RTSC system commands the SCP-HUB to send an additional SS7 SCP-HUB Qualification Directive data packet to the associated MMI Maintenance Position computer terminal. Contained within this Qualification Directive data packet a specialized 10 digit Mobile Identification Number (MIN), and the normally assigned MSN.

The MMI is connected to an MSCs or host network management center maintenance port or test port via data link, and then causes a specific cellular or PCS network base site, and or base site group to transmit a forward analog or digital control channel page. The MMI can cause an entire cellular or PCS base site network to broadcast a forward control channel or signaling channel page via air interface data link. The transmitted page causes the aforementioned application specific data status reporting protocol to respond and complete its task, in one or a multiple set of communicators simultaneously. In this way the RTSC system can cause up to twenty different MIN pages to be sent to a stationary or mobile application specific communicator. These page messages or MPCDs can be primarily formatted in conventional BCH block code data, or be configured for dispersal in caller I.D. format. Each MIN represents a specific data communicator program. This program is essentially a wireless data communicator management software, contained within firmware, to cause the communicator system to initiate, and complete specific system status changes and data communications system status reporting, via a designated air interface data link. The status reporting is contained in application specific data packets that are specially formatted.

The data packets are transmitted over the currently serving cellular or PCS networks, via analog or digital wireless control channels, and signaling channels via an air interface link that is received by currently serving base site. The base site is connected to the currently serving MSC via primary base site data link, and in turn the MSC is connected to a host SS7 network via an MSC data link. The MSC is an SS7 network element service switch point (SSP). The MSC relays these application data status packets back to the SCP-HUB via a IS-41 compatible SS7 network data link. The SCP-HUB then submits received status data packet for further evaluation, processing, and format conversion. The packet is then relayed to a designated Application Service Provider (ASP), via a designated wireline or fiber data link that is either internet compatible or uses other data link protocols. The ASP receives converted status packet via a dial up network data link, permanently assigned dedicated circuit, or internet data link. Upon reception of the data packet, the ASP takes appropriate action.

The invention provides specialized application specific communicator controls such as specific access assignment to cellular and PCS carrier's whose operational footprints overlap one another. This controls which network the mobile application specific communicators status response packet is allowed to access, such as the A side cellular carrier, or B side cellular carrier, or PCS C-block, or mobile satellite carrier operating in a given metropolitan statistical or service area (MSA) that covers a specific city or region.

Referring to FIG. 1, the Remote Telephony System Control system comprises an SCP data management hub, wireline interfaces to application service providers (ASP), network management subsystem (NMS) data management systems, data location registers (DLR), specialized SCP-HUB subsystem MAP software, and unique MMI MAP interfaces, software and firmware. Accordingly, the RTSC system-protocol is as follows. When an ASP deems it necessary to cause a forward page trigger-event to occur, its data management sub system creates a generic page request 50. The ASP then sends the forward page request to the SCP-HUB via the internet world wide web 51, or by dial up. The SCP-HUB receives the generic page request 52, and then the SCP-HUB network management subsystem initiates an RTSC forward page trigger-event protocol 53. This protocol allows for delivery of the message/page call delivery (MCPD) in conventional forward control channel data formats, or caller I.D. formats. The NMS then interrogates the DLR for user specific information 54, such currently operating location, most recent registration status, host carrier identification and other such user status data, and currently serving VLR entries. The term 'user' in the context of the RTSC system simply relates to whether the particular application-specific data communicator is a mobile unit, or a stationary unit. These units are not typically manned. Additionally, the user information stored in the DLR and other subsystem data-bases will indicate what type of application specific communicator is involved; electrical meter reading, motor vehicle fleet management, vending machine status reporting and many others. Once the DLR interrogation is complete, the NMS subsystem creates a two-packet forward page-trigger-status response event 55. Since two packets are required, the NMS subsystem interrogates its own internal data structures and determines that in this case both packets need to be formatted in accord with IS-41/SS7 standards; and 56 therefore, a specially modified IS41/SS7 Qualification Directive, Registration Notification, or Registration Cancellation is prepared 57.

Referring to FIG. 8, depicts a IS-41 based SS7 network signaling system Mobile Application Part-Transaction Capability Application Part (MAP-TCAP) Qualification Directive packet 121. This packet can also be configured as a Registration Notification or Registration Cancellation invoke. This packet is used throughout the United States in signaling networks that adhere to IS-41, A, B and C standards. Additionally, a derivative of this packet 121 is used by the Global System for Mobile (GSM) signaling network data links. Therefore, The RTSC Qualification Directive that is specially modified for the purpose of enabling specialized forward pages and specialized VLR entries that will work seamlessly world wide. Contained with this packet is the Mobile Identification Number (MIN) and Mobile Serial Number (MSN) 122. Other conventional information includes System Type codes, Qualification information codes and other types 123, and 136. Some codes are mandatory and optional, represented by the letter 'M' and 'O' respectively 137. The lines of code that must be sent every time this packet is utilized are classified as mandatory data. The lines of code that are sent only when needed are deemed optional. There are 'empty' registers of data 124, 125 and 126. These data fields are used to contain command-instruction sets used by the present invention to cause the MMI MAP software contained within the MAP terminal to initiate and actualize. The MMI Map Terminal is co-located at the currently serving MSC or carrier network management center, and is deemed an SS7 network node with its own assigned destination point code (DPC) and originating point code (OPC). The MMI MAP software then examines the Qualification Directive packet's MIN and MSN fields 122, and retrieves the MIN information. Once the MIN information is retrieved, the software creates a forward page trigger event packet, commensurate with the host cellular, or PCS switch-fabric data communications standard, that is utilized by the currently serving switch platform. Mobile satellite ground station switch standards are also considered in accord with the present invention. Mobile satellite systems include but are not limited to, the Microsoft Teledesic LEO system, The 66 satellite Iridium Leo system, Inmarsat A, B, M, and P formats are compatible with the invention. The American Mobile Satellite Communications (AMSC) network for LEO and Geosynchronous systems is also compatible with the invention. The invention will work seamlessly in these aforementioned satellite networks. Therefore, satellite based application specific data mobile and stationary telemetry communicators can receive forward page-trigger event packets in the same means and method as cellular and PCS mobile and stationary communicators.

Referring to FIG. 1, once the IS-41/SS7 Qualification Directive for VLR user profile entry/update is prepared 57, and the IS-41/SS7 Qualification Directive for forward page data trigger data packet is prepared 58, the next event of the RTSC system protocol is ready to proceed. Therefore the Qualification Directive with special MMI MAP terminal instruction sets is sent to the currently serving VLR via a public or private SS7 signaling network data link 59. This specific action clears the previous VLR user profile entry. A typical VLR user profile entry is made when a roaming mobile registered in its associated currently service MSC. Since all mobile or stationary application specific communicators are deemed 'roamers,' manipulation of user profiles of the VLR is critical. When the mobile or stationary application specific communicator registers, or transmits a status response data packet event, the currently serving MSC, analyses it received MIN and determines that it is a 'roamer,' and relays the information to its associated VLR. The VLR then interrogates the DLR via the associated SS7 network, and the DLR either authenticates or denies service. If the DLR authenticates, it then sends a return result packet to the VLR, the VLR subsequently creates an entry in its user profile register. The VLR also sends location information; such as carrier identification, serving switch number, and other pertinent user profile data.

Another important feature of the invention combines SS7 network manipulation, VLR service profile manipulation, and specialized PSTN MPCD manipulation. In some cellular, PCS or mobile satellite networks usage of a modified MMI MAP terminal is not required. The invention uniquely combines SS7 network, PSTN, and SS7 node in integrated manipulation scheme, that in fact, creates an additional application specific network overlay for forward page and communicator message delivery for cellular, PCS and mobile satellite networks. This unique manipulation scheme enables multiple MIN authentication; via SS7 and IS-41 automatic roaming procedures. By manipulating these aforementioned features, further manipulation of message/page call delivery (MPCD) via a PSTN trunking protocol is also made possible. Cellular networks experience thousands of incomplete calls. The invention uses incomplete calls to enable MPCD procedures, and to produce additional revenue for cellular, PCS and mobile satellite carriers without the need to add equipment, software or other infrastructure elements to these existing networks. In addition the inventions MPCD procedure creates an innovative solution for the purpose of providing low-cost application specific data services to the wireless service community, and the public-at-large.

Figure 4:
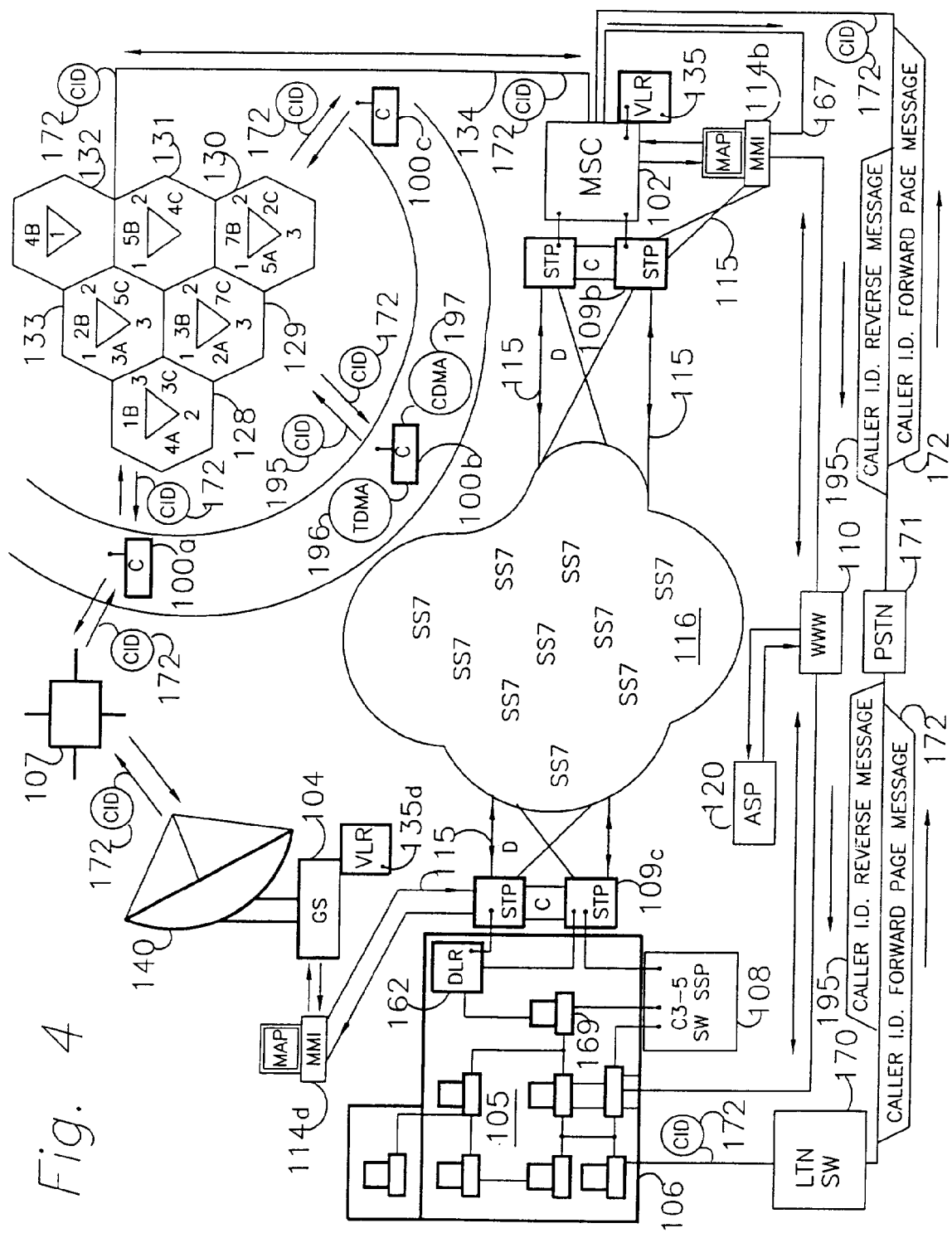
FIG. 4 is a block schematic of the preferred embodiment of the RTSC system network elements, according to the invention.

Referring to FIG. 4, the broad structure of the inventions MPCD system protocol combines six key manipulated areas; (1) Temporary Location Directory Number (TLDN) for application specific data use only. (2) Specialized use of non-dialible 100–199 number range NPA/Area codes. (3) Manipulation of incomplete call and PSTN trunk access while using a dialable TLDN. (4) Manipulation of IS-41/SS7 invokes, directives and cancellations. (5) Manipulation of SCP and SSP, i.e., VLR and MSC user data base structures. And, (6) manipulation and use of caller I.D. formatted message information that contains a MIN message. These six protocol levels that interrelate and communicate with one another operate within the parameters of conventional PSTN, SS7, cellular, PCS and mobile satellite networks, comprise the inventions core MPCD system protocol. The MPCD protocol system is in fact a sub protocol that further supports, and reduces to practice, the Remote Telephony System Control and apparatus (RTSC) in yet another effective way.

One example of the detailed MPCD system protocol is as follows; an application service provider (ASP) 120 invokes an MPCD request. The SCP-HUB facility 106 receives the request via the internet world wide web (WWW) 110. The request is formatted in conventional TCP/IP data packet protocol. The network subsystem terminals 105 receive and process the MPCD request. The request packet contains the particular application specific communicators MIN and MSN. The network subsystem identifies the user, and interrogates the data location register (DLR) 162 to find out the current operating location of this particular application specific communicator 100b.

Figure 6:
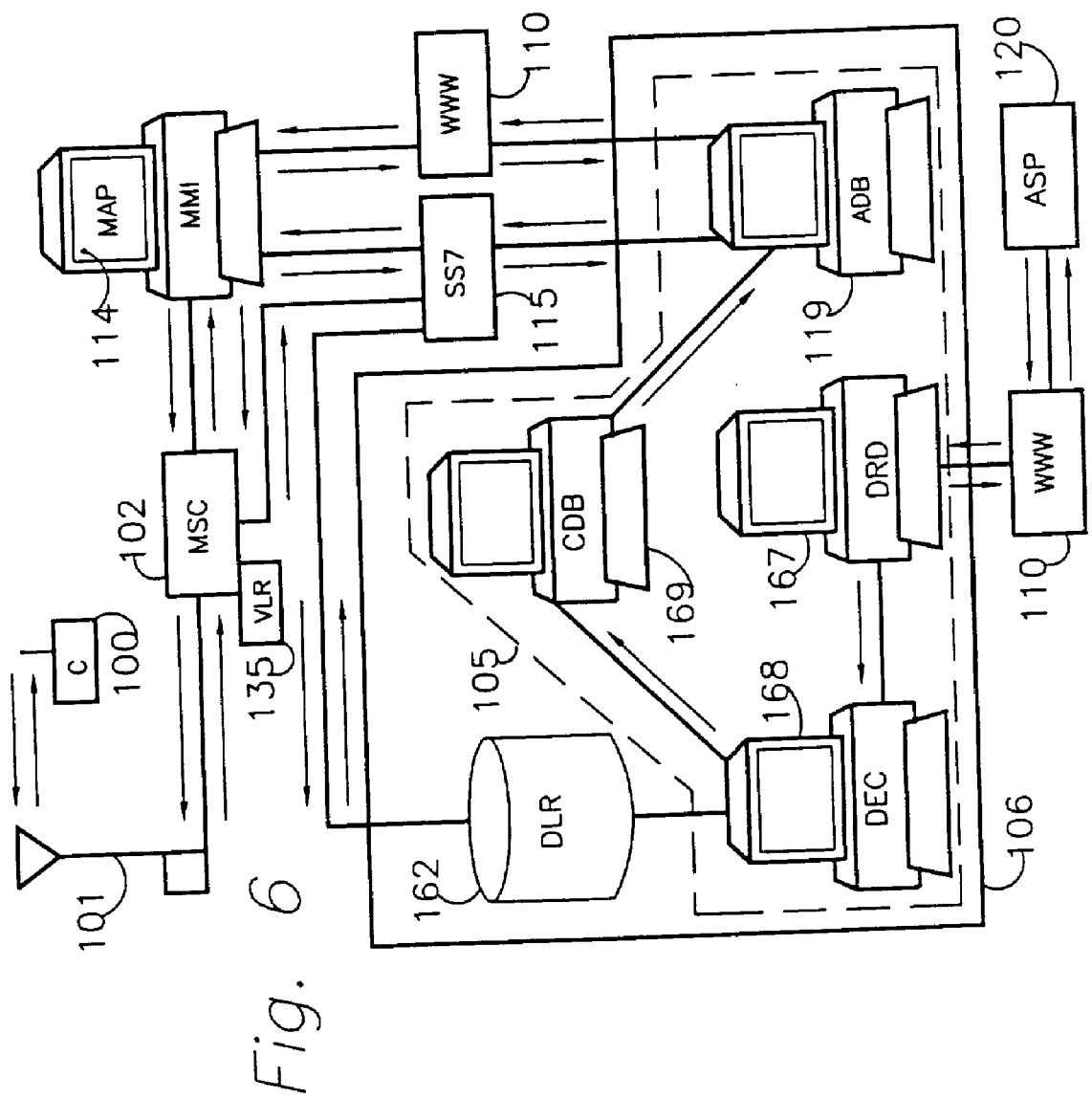
FIG. 6 is a block schematic of the RTSC protocol flow from the SCP-HUB to other RTSC network elements, according to the invention.

The DLR 162 data base is specially configured to receive and send conventional SS7 IS-41 automatic roaming data packets such as Registration Notifications, Remote Feature Access Control messages, Registration Cancellations, Qualification Directives, and other such conventional messages. However, the DLR is designed and configured in a completely innovative means and method. Referring to FIG. 6, the DLR 162 is directly connected to the comparative database (CDB) 169 via a primary communicative link 191.

The CDB 169 also contains user profile data base registers that have the storage and processing capacity to process 20 MIN numbers. These special MIN numbers have an NPA range of 100 to 199. The CDB 169 can be configured as dynamic multi-layer stack that adds complete flexibility to the DLR 162. In fact with the addition of this special data processing stack, the invention creates a completely new approach to SS7 service control point (SCP) design, and operation. Typically conventional SS7 SCP nodes are inherently rigid in terms of how IS-41 automatic roaming packets are processed. The invention enables complete data messaging flexibility. Furthermore, the dynamic flexibility enables a new list of application specific wireless-data-services.

The DLR is also configured to add a date and time code 'stamp' each mobile application part/transaction capability application part, (MAP/TCAP) packet arrives from a VLR, HLR, SSP-switch, MSC or any other SS7 node. Every time a Remote Feature Access Control packet, or Registration Notification, or any other IS-41 SS7 packet arrives at the DLR 162 from an associated SS7 link 115. Another unique function of the inventions DLR is that every time a Remote Feature Access Control packet, or Registration Notification, or any other IS-41 automatic roaming packet arrives from an associated SS7 link 115, it is forwarded to the CDB for storage, analyses, and further processing.

Figure 14:
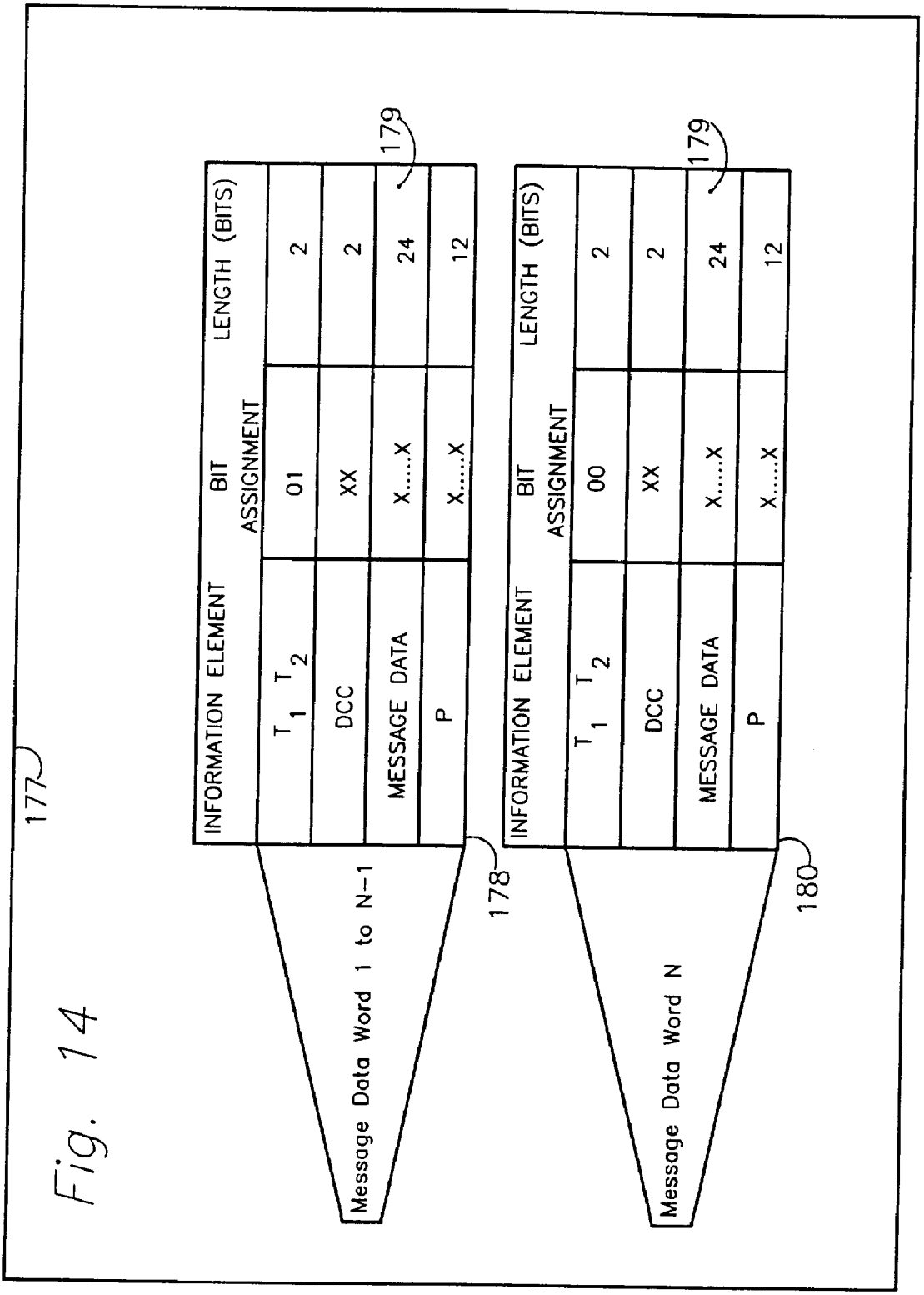
FIG. 14, depicts two FOCC forward analog control channel extended message protocol words, according to the invention.

Referring to FIG. 4, once the preliminary process of the ASPs 120 MPCD request as been complete, the appropriate MPCD invoke protocol is prepared. The communicator 100b is configured to receive extended FOCC protocols that deliver a previously chosen MIN number that contains an NPA of 100 to 199. In this case the MIN number is configured with a '175' NPA or area code. Referring to FIG. 14, here is depicted an extended FOCC protocol data packet 177 that is comprised of two words. Message data word 1 to N−1 178 and message data word N 180 contain specialized message data 179. This extended protocol two word packet 177 operates within the forward analog control channel protocol (FOCC) in an IS-54B, and IS-136 TDMA dual mode analog/digital network. Additionally this same extended protocol packet 177 operates in an IS-95 CDMA dual mode analog/digital network on the overhead forward analog control channels (FOCC).

The extended FOCC packet supports the delivery of caller I.D. formatted data within the bit structure of the message data 179. Referring to FIG. 4, this particular communicator 100b is primarily analog cellular communicator. It only transmits and receives application specific data on analog forward and reverse control channels. However, this communicator 100b can recognize and receive the depicted extended FOCC protocol two-word packet in FIG. 14. In fact this particular communicator 100b is configured to detect, receive and analyze caller I.D. formatted messages (CID) 172, as depicted in FIG. 4. These CID messages 172 were originally designated for mobile cellular radios that support the reception and transmission of control data via analog control channels, and voice services on analog voice channels, and CDMA and TDMA configured digital traffic channels. The communicator 100b also detects conventional forward FOCC analog control channel page protocol words. During an MPCD data event the communicators 100b one of 20 specialized MIN numbers is contained within the data structure of the aforesaid FOCC analog control channel page protocol word. The CID formatted message 172 can also contain one of 20 MIN numbers.

Referring to FIG. 4, another important embodiment of the invention is that the application specific data communicator 100b is specially configured to recognize the MIN contained in the CID message 172, in same way it receives an MIN in the conventional FOCC forward page protocol. The communicator 100b is designed to; detect and receive of the CID formatted MIN number, and (1) respond to the reception the CID-MIN, by creating an application specific status response data message, such as a modified Remote Feature Control Request data packet and transmitting it to an associated base site 129. Additionally, the communicator 100b is configured to detect FOCC extended protocols that are transmitted from cellular networks that are IS-54, and IS-136 TDMA compatible 196, and IS-95 CDMA compatible 197. Within these extended protocols are data bit provisions for transmitted caller I.D. information and other data such as message waiting indicators (MWI) that are manipulated by the invention to contain application specific data messages.

Messages such as command invokes and other information designated for forward transmission to communicators that are integrated to such devices as a GPS receivers, power meters, vending machines or other such apparatus. This particular base site for example, is configured to provide IS-136 TDMA digital traffic channel services, in addition to its analog control channel and voice channel service capabilities. This base site is configured to transmit the extended FOCC protocol data packet as depicted in FIG. 14. (2) Cause specific embedded communicator firmware to respond to the reception of a received MIN. This response causes the internal program change to occur in accord with the instruction set so associated with the MIN. In this example, a modified Remote Feature Access Control packet is not sent as an application specific status response packet. However, a 'receipt' is needed to verify the action just completed. Therefore the invention provides the means and method of causing an autonomous registration to be transmitted from the application communicator 100b as depicted in FIG. 4. The communicator 100b has the ability to 'store' up to 20 MIN numbers. Each number is associated to specific command response actions. When a receipt action is required, the communicator firmware inserts the associated 'receipt' MIN number into the A and B word of the aforementioned autonomous registration packet, that was just received via a conventional FOCC forward control channel page transmission. The same 'receipt' can occur from the reception of CID formatted MIN information in the extended FOCC protocol depicted in FIG. 14.

The inventions receipt 'action' is hidden in a conventional RECC autonomous registration action. When the registration packet is transmitted, conventional IS-553 and IS-41 authentication algorithms occur, and cause the associated base site and MSC to 'handle' the action as a conventional 'roamer' registration. However certain key procedures need to occur before this 'receipt' action can be initialized and completed.

Figure 3:
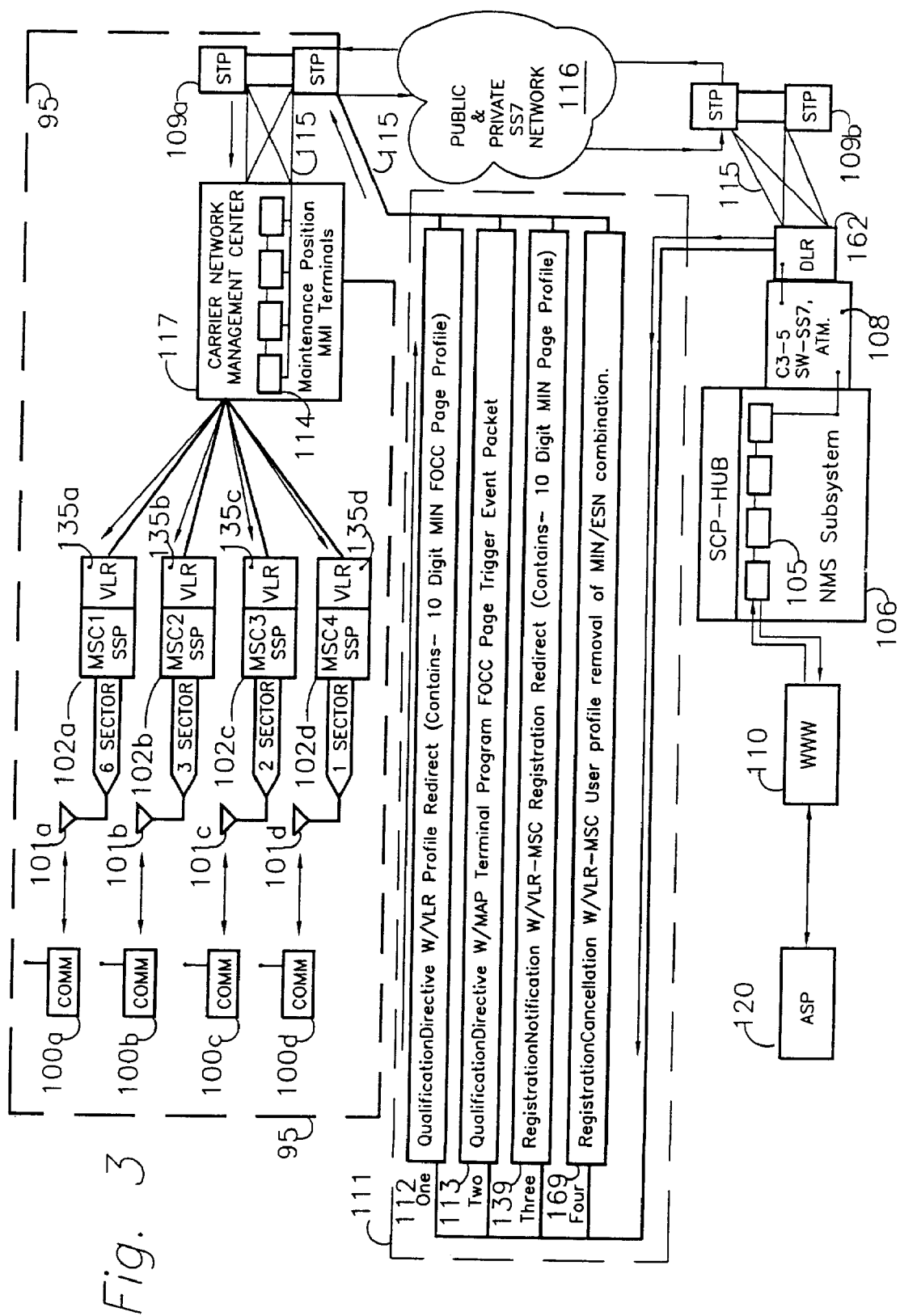
FIG. 3 is a block schematic of the preferred embodiment of the RTSC protocol and core network elements, according to the invention.

Referring to FIG. 3, the inventions SCP-HUB 106 prepares to initialize and complete the MPCD data event in the following protocol structure. The network management subsystem 105 first analyses the designated MIN number contained in the ASP MPCD request packet. Secondly, the NMS 105 that includes the comparative database (CDB) depicted in FIG. 6, interrogates the inventions DLR 162. Within the data storage and processing structures of the DLR and the comparative data base/stack, is user profile information that consists of; the communicators assigned 20 MIN numbers, and Mobile Serial Number (MSN), a temporary location directory number (TLDN) that is an associated 10 digit directory number. This associated 10 digit directory number is configured for access from the PSTN network. The invention utilizes the TLDN number for unique reasons, and the number is manipulated in completely innovative ways. Since the invention utilizes a non dialable MIN such as 175-421-1061, it must utilize the TLDN within the means and method of the MPCD forward data event.

Figure 12:
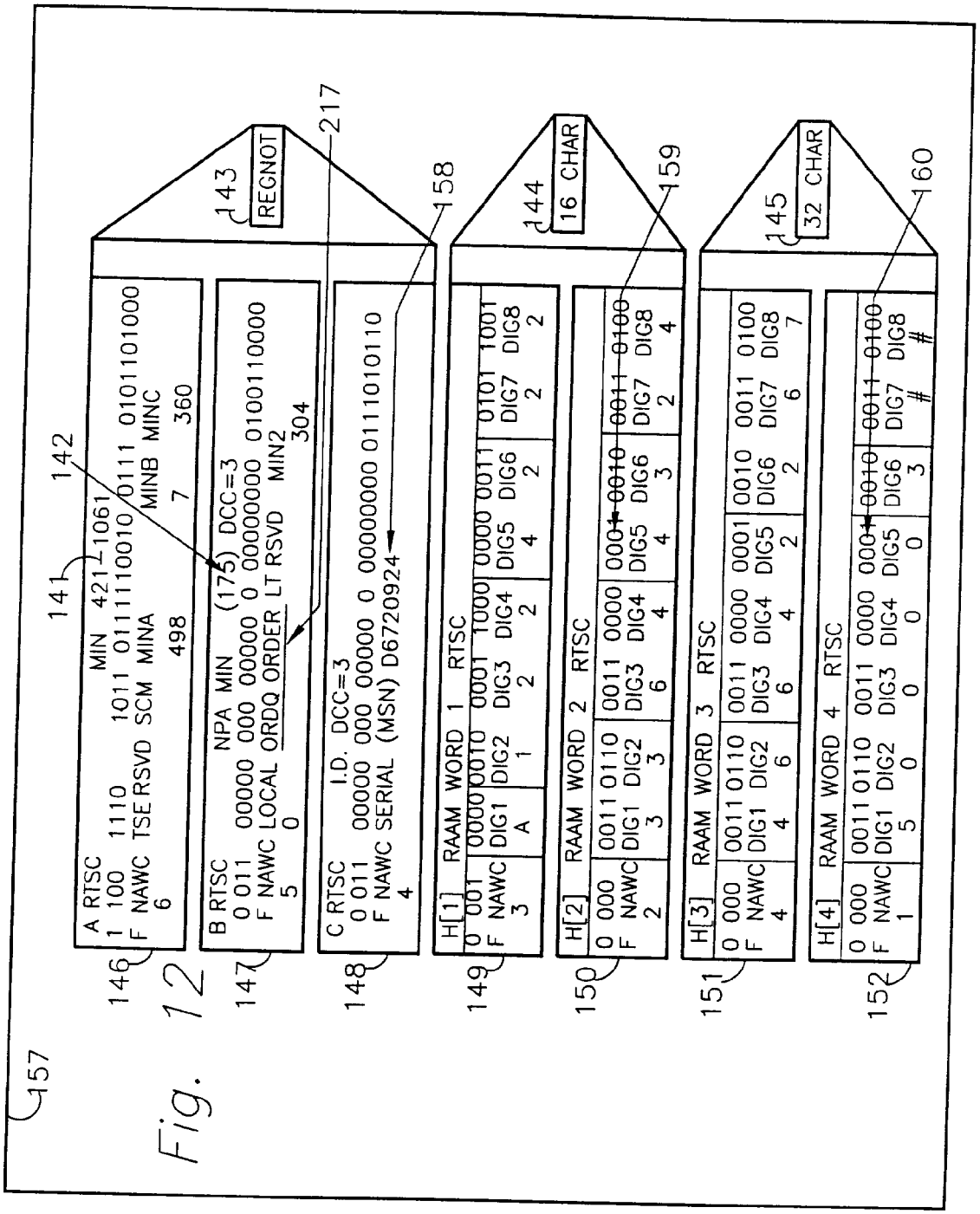
FIG. 12, is a representation of an application data packet used in a typical analog cellular environment, according to the invention.

In conventional cellular and PCS networks the TLDN is used to support voice services when a cellular radio user 'roams' in another cellular network area other than his 'home' cellular network. Its specific usage arises from the fact that cellular radio user needs an additional access number. The user's home network MIN will not be accessible when a home network area landline-caller dials his MIN number in the process of placing a PSTN call. The conventional TLDN assignment is as follows. When a conventional cellular radio user roams into another cellular network the radio detects the carrier signal of the currently serving cellular system. The radio invokes a autonomous registration. The RECC analog control channel data packet 157 that is depicted in FIG. 12, contains the three data word autonomous registration structure 143. The A word 146 contains the office and node code of the MIN '421-1061' 141 and the B word 147 contains the NPA or area code '175' 142. The C word 148 contains the WSN 158. These three words comprise the autonomous registration data structure. This structure is the autonomous registration packet so specified in IS-553, the standard that encompasses the AMPS cellular base site and mobile radio operating protocols.

After the radio transmits its autonomous registration packet to the associated base site of the currently serving cellular system, certain user authentication procedures initialize and complete. The base site 101a receives the autonomous registration packet, and automatically relays it to the associated MSC 102a. Once the MSC receives the packet, it analyses it, detects the 'roamer' NPA and sends the packet to its associated VLR 135a. The VLR promptly relays the user information to the 'home' systems associated HLR, in the form of a Registration Notification invoke. The associated HLR responds with an authentication authorization within three seconds and send the authentication authorization to the currently serving systems associated VLR 135a. The VLR assigns a TLDN to the 'roamers' user profile database and forwards the TLDN information to the 'home' systems associated HLR.

When a local home area land-to-mobile caller dials the cellular radio users MIN, the associated land telephone network (LTN) sends the call request to the local cellular MSC that is associated with the dialed MIN number. The MSC interrogates its associated HLR, detects the currently assigned TLDN that is associated with the received MIN number, and dials the TLDN via the PSTN. The currently serving cellular systems MSC now receives the call request via a PSTN trunk, interrogates its associated VLR, detects the associated MIN. The MSC than sets up a switch route pattern to the currently serving base site and invokes a forward page via an associated base FOCC control channel. The mobile cellular radio responds to the page with a ring tone, and the user picks up the radio handset, presses the send button, therefore completing the land-to-mobile call procedure.

The present invention completely manipulates the aforementioned call procedure in such as way that a new forward messaging system becomes enabled and created. The MPCD manipulates the conventional call set up in such a way that it creates a completely secure messaging system that supports such applications as wireless security panel interrogation. For example (1) The TLDN number information is not available to the general public, for it is stored in databases not in the least accessible to the public or unauthorized personnel. (2) The inventions 100–199 NPAs do not allow access to the application specific communicator via the PSTN and LTN networks. And, (3) the general public and other unauthorized personnel do not have access to SS7 networks, and SS7 network nodes such as SCPs, and SSPs. All SS7 networks are used for highly specialized cellular, PCS and satellite intersystem network element-to-element communications. The invention provides a unique approach to providing a secure application specific communications medium for wireless security system reporting, fire protection system reporting, motor vehicle anti-theft and recovery systems, high value cargo tracking and other such applications.

Referring to FIG. 3, after the ASP 120 MPCD request has been received, and the specific type of forward packet protocol has been identified and prepared, the next phase of the MPCD protocol commences. The particular MPCD page request packet contains information that indicates that (1) a status response packet needs to be obtained from communicator 100b that is associated with a particular MIN. And, (2) the MPCD page request also requires a 'receipt' action to occur from the same communicator 100b, after the completion of the first action. The MIN associated with the receipt action is different than the MIN associated with the requested status response action. In order to complete the first part of the ASP request the MPCD system protocol initializes and completes in the following manner. The NMS subsystem 105 interrogates the DLRs 162 user profile that is associated with the communicator 100b. The NMS 105 determines that MIN and MSN combination that is presently active, is different than the first MIN and MSN number contained in the MPCD page request. The mobile subscriber number (MSN) also known as an Electronic Serial Number (ESN) is listed in the user profile, and is an essential information element used for communicator identification and authentication. However, when 'rotating' the MIN entries in the currently serving VLR the ESN never changes and is therefore not manipulated.

The NMS 105 sends an instruction set to the inventions DLR to send a Registration Cancellation invoke 169 to the associated VLR 135b, via a primary SS7 link 115. The associated STP 109b relays the Registration Cancellation invoke to the public or private SS7 network 116. The network further relays the cancellation packet to the cellular systems associated STP 109a. The STP then relays the packet to the associated VLR 135b. The cancellation action essentially erases the user profile that was previously inserted by the VLR as a result of a previous action caused by a registration notification transmitted from the communicator 100b, or by possible manipulation by the inventions MPCD system protocol. Contained within this Registration Cancellation invoke is the same MIN and MSN that was detected after the aforementioned DLR 162 interrogation. Once the user profile entry is removed the NMS 105 causes the DLR 162 to send a Registration Notification invoke to the same associated VLR 135b via the associated SS7 network. Contained within the Registration Notification invoke data packet is the same MSN number designated for communicator 100b. However, a MIN number that matches the ASPs MPCD page request has been inserted by the NMS subsystem 105. When the Registration Notification invoke reaches the associated VLR 135b, a new user profile is inserted. The VLR 135b then assigns a new TLDN. The TLDN information, currently listed MIN, ESN, carrier number, switch number and other pertinent information is sent to the DLR 162 via the associated SS7 network. Once this new user information arrives at the DLR 162, it relays an 'event update notice' to the NMS 105. As a response, NMS 105 initializes another stage of the MPCDs page message delivery protocol.

Figure 15:
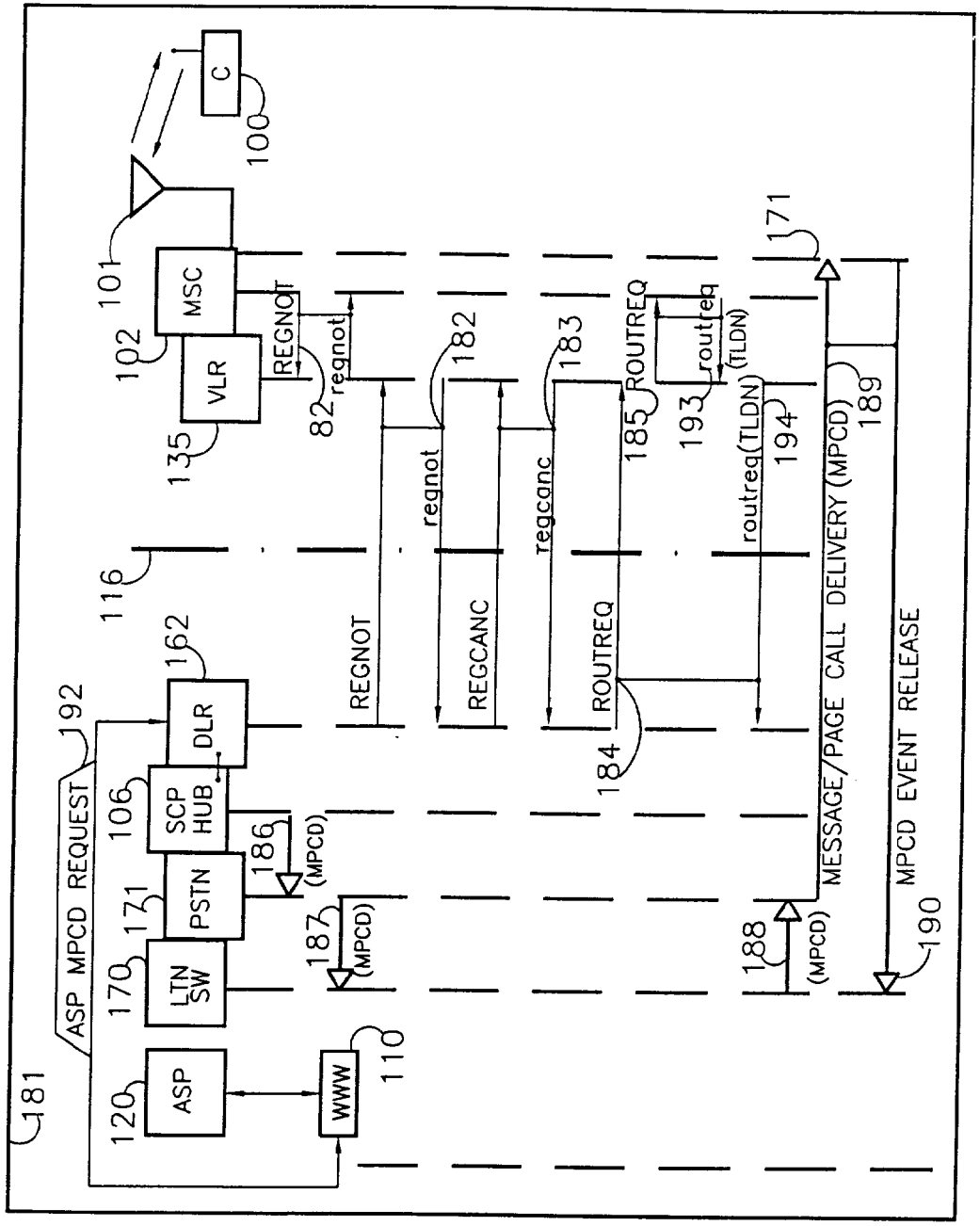
FIG. 15, is a block diagram of the unique manipulation of PSTN and SS7 network manipulation, according to the invention.

For example referring to FIG. 15, first the Registration Cancellation, 'REGCANC' invoke 183 is completed. Then the Registration Notification invoke 82, the completed 'REGNOT' 182 is completed. The 'ROUTREQ 184 from the DLR 162 to the serving VLR 135, causes the VLR to forward the ROUTREQ 185 to the associated MSC 102. The MSC 102 appends the TLDN to the routreq 193 and forwards the instruction to the VLR 135. The VLR 135 the routeq with TLDN 194 to the DLR 162. Once this portion of the aforementioned protocol has been completed, the following processes and procedures occur. The SCP-HUBs 106 NMS subsystem 105, causes its own associated SSP SW 108 as depicted in FIG. 4, to forward the designated MIN in the form of a PSTN voice MPCD 186 trunk call from SCP-HUB to common PSTN network primary link. And, from the PSTN network primary link to an LTN switch 187. The LTN switch 170, forward the MPCD call via a long distance trunk 188, and the long distance trunk transports or delivers the call 189 to the currently serving MSC 102.

The SCP-HUB can access a PSTN trunk via a DTMF dial up or MF trunk access via a conventional LTN switch 170 as depicted in FIG. 15. This particular MPCD 'action' is used to invoke and place a 'pseudo' call to the currently serving cellular network, represented by MSC 102, and the application specific communicator 100. The pseudo call is placed using the currently assigned 10 digit TLDN that has the currently serving cellular market area code or NPA. The MPCD PSTN trunk call set up will never be complete in a conventional sense. The communicator 100, in terms of this particular event is turned on or 'powered up,' and is currently in idle mode awaiting instructions in range of the associated base site 101. The DLR 162 knows that the communicator 100 is operational, because the currently serving MSC sends a cellular subscriber station active status (CSSACTWVE) status to the DLR 162 upon completion of the aforementioned authentication protocols.

When the MPCD call is placed, the land telephone network (LTN) routes the call through various PSTN switches and other associated network elements. The call eventually reaches the currently serving MSC 102. The MSC analyzes the call via its appended TLDN, and interrogates the VLR 135. The VLR identifies the TLDN as being momentarily associated with the MIN number that is currently listed in the associated application specific communicator 100 user profile. Once this procedure is complete, the associated VLR relays the currently listed MIN number to the associated MSC 102. The MSC detects the active presence of the communicator 100 by verifying that it is fact within range of the associated base site 101. Once detected, the MSC routes the call to the base site, assigned forward and reverse voice channels and sets up a page. The page is transmitted to the communicator 100 via the associated FOCC forward analog control channel. The communicator 100, then receives the page. The SCP-HUB 106 NMS subsystem verifies that the communicator 100 receives the call via conventional PSTN means and terminates the call by simply disconnecting the PSTN trunk pathway previously setup to complete the MPCD action, and release the MPCD event 190.

Once the communicator 100 receives the page it also ceases the call in conventional means and methods, which by default indicates to the associated base site 101 and the MSC 102 that the call has been terminated, and therefore is incomplete or is in an idle but 'no answer' state. The duration of the application specific event occurs between 500 milliseconds to 1.8 seconds, so impact on the associated PSTN and cellular network bandwidth resources is minimal. The communicator can now respond with either a status response packet in the form of specially modified Remote Feature Access Control packet, or by sending an autonomous registration packet as a 'receipt' action in the previously described manner.

The MPCD protocol system also provides a unique means and method of delivering a 'page/message' via caller I.D. (CID) to an application specific communicator. Additionally the invention provides the means of transmitting a CID based message to the inventions SCP-HUB from the communicator 100, via the currently serving cellular network using extended RECC protocols. Additionally the invention provides transmitting application specific CID data over analog or digital reverse voice or traffic channels to the SCP-HUB via a PSTN trunk.

Figure 13:
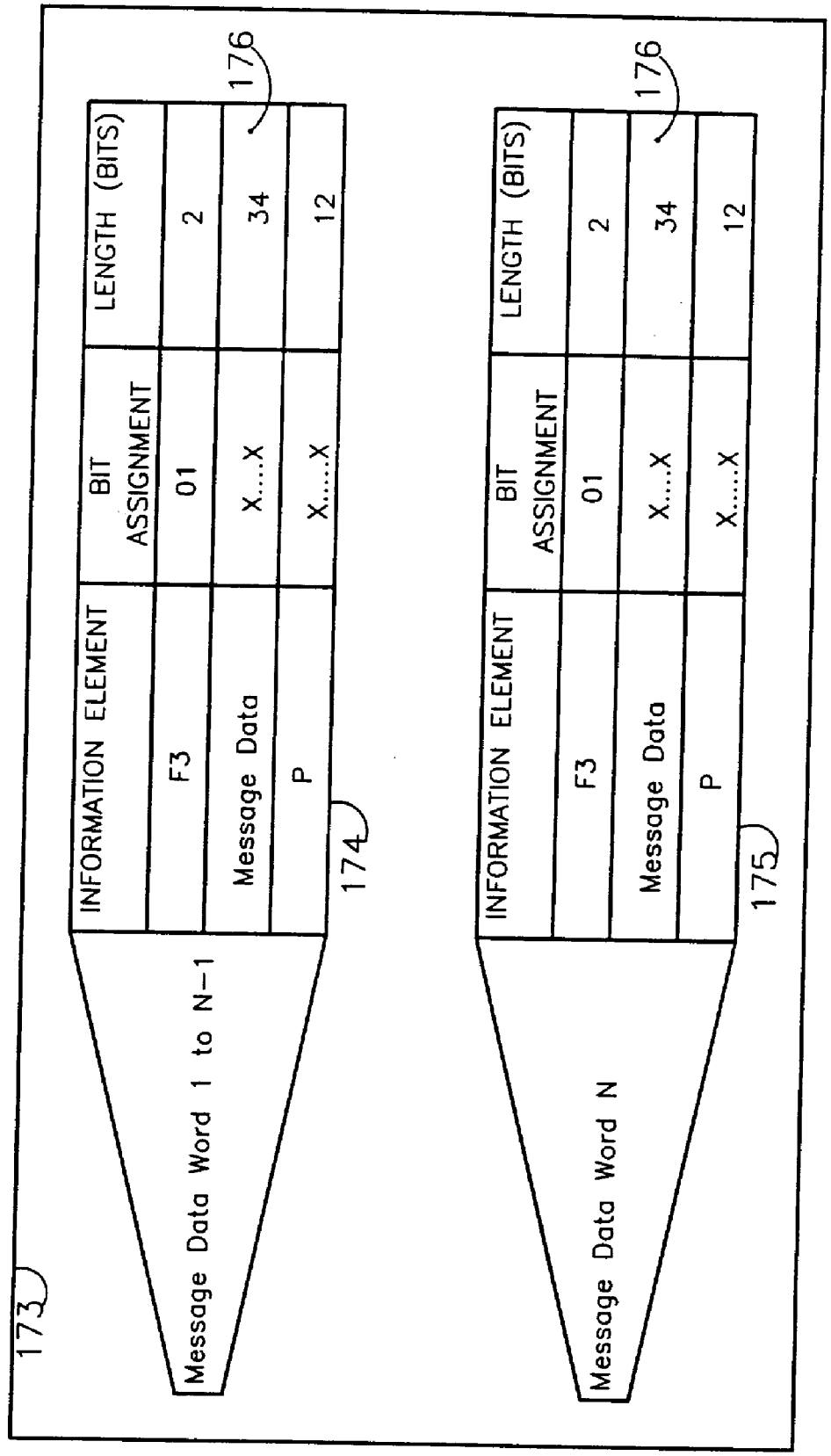
FIG. 13, depicts two reverse control channel extended message protocol words that are used in an analog cellular network, according to the invention.

Referring to FIG. 13, there is provided a unique usage of the reverse control channel (RECC) extended protocol two word packet 173. Contained within this packet are two extended protocol words 174, and 175 that contain 34 bits of message data that is manipulated by the invention to contain caller I.D. bit format data 176. This data contains communicator and application specific device data. This data is a reporting medium is read at the inventions SCP-HUB for data storage, and analyses. This same data is also forwarded to application service providers (ASP) via the internet or private data link.

All application specific communicators have one primary MIN number and up to 19 additional or sub-action' MINs, but only one MSN. Therefore, it is necessary clear or cancel the current VLR user profile MIN entry every time a new forward page trigger event has to be transmitted to a designated communicator, or communicator group. This clearing action is not necessary if the selected MIN being sent by the SCP-HUB for forward page action matches the current VLR MIN entry. This VLR entry is stored in the SCP-HUBs DLR database. Every time a VLR sends a Registration Notification (REGNOT), or other action to the DLR, it responds and sends an acknowledgment back to the VLR.

Referring to FIG. 1, the associated to serving VLR receives the packet and creates a new user profile entry with the new MIN number 60. Next, an IS-41/SS7 based Qualification Directive packet containing the aforementioned modified information, plus the primary or sub MIN is sent to the associated MMI MAP terminal 61. An additional feature is provided that causes the forward paging action to occur over the internet world wide web. The SCP-HUB can send a compatible TCP/IP data packet to an associated MMI MAP terminal that is configured to receive internet based information via an internet data link. In addition, MMI MAP terminal node data signaling protocol can operate in a broadband Integrated Services Digital Network (B-ISDN), using Asynchronous Transfer Mode (ATM) protocols in a virtual-circuit packet switching environment This is accomplished with a connectionless or dedicated ATM data link. The same information described in the IS-41/SS7 based Qualification Directive, that is designed for forward page actions, can be contained and transported in a TCP/IP packet or ATM packet. The MMI MAP terminal does not have to be SS7 compatible. However, SS7 network data packet communications are robust, and data packet event time duration is almost always predictable. Internet based data communications quite often suffer from data event duration lag. This phenomenon is caused by unpredictable network element capacity problems arising from internet service provider (ISP) data link saturation, and network node failure. There are data security issues to be considered on the internet. Conversely, an SS7 network has virtually no security problems. SS7 networks do not support or allow public access. Unpredictable internet lag is not acceptable for such applications as security system alarm reporting, fire alarm and control system reporting, communicator velocity tracking, automobile anti-theft and recovery services, emergency 911 services and other public safety related applications. Therefore, using SS7 network data links for all RTSC system data event communications is preferred.

Referring to FIG. 1, the MMI MAP terminal receives the forward page data packet, and initiates the automatic RTSC MAP system program 62. Next, the associated RTSC MMI MAP system reads the received Qualification Directive page invoke 63, and then creates the appropriate page protocol commensurate with the associated switch fabric data communications format 64. Next, the RTSC MMI MAP system sends page to the designated BS(s) via associated switch fabric 65. The currently serving base site receives forward page data-packet from the associated MSC switch 66. The base site subsequently transmits a forward page to a designated mobile or stationary communicator via a designated air interface data link 67. In fact the inventions RTSC MMI MAP system can sends a special 'global' sub, or action or command MIN that causes a plurality of application specific wireless data communicators to respond, all at once or in a time delay cascade means and method. After reception of the forward page, the application specific communicator analyses the MIN and responds appropriately to its internal program structures 68. The mobile or stationary application specific communicator then prepares an appropriate status response data packet 69. Next, the communicator transmits status response data packet via an analog or digital air interface control channel or signaling channel data link, associated with the currently serving base site 70. The serving base site receives status response data packet 71, and then sends the packet to the associated MSC switch via a designated data link 72. The currently serving MSC switch analyses, identifies it as belonging to a designated DLR and converts it to an IS-41 SS7 data packet 73. The MSC switch sends the data packet to the DLR and SCP-HUB via an SS7 data link 74. The SCP data management hub receives the status data packet 75, and processes the contained data accordingly. For example, the received information contained with the packet may be stored in a designated user database. Additionally, the packet can be forwarded back to the associated ASP for additional status analyses and processing.

Figure 2:
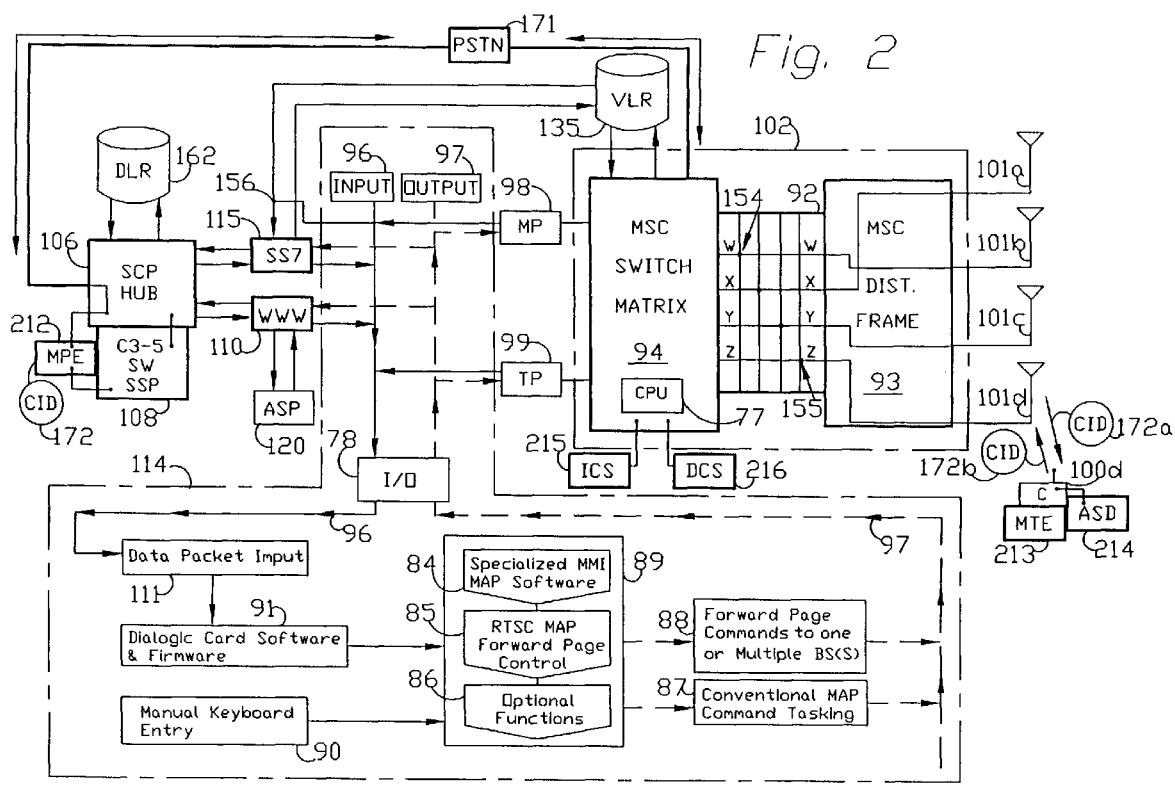
FIG. 2 is an illustration depicting the preferred embodiment of the RTSC system MMI Maintenance Position Terminal interacting with other network elements, according to the invention.

Referring to FIG. 2, depicted here is a representation of the MMI MAP RTSC system protocol, and its associated host network elements. The SCP-HUB 106 along with its associated DLR 162, control and manage all incoming data packets sent from an ASP 120, and a currently serving MSC 102, and its associated VLR 135. The SCP-HUB is interconnected to the serving MSC via an SS7 data link 115. The MMI MAP terminal 114 is connected to the SCP-HUB via its input port 96, in this case is a RS-232 socket interface, which is connected to a dedicated 56 KBPS data link. The data link is an element of an associated SS7 wireless and wireline telephony signaling network. This same socket can be connected to the internet-world wide web (WWW) 110. The MMI MAP Terminal 114 is connected to its associated switch Maintenance Port 98. This input interface is also known as a Test Port 99, and enables access to the same switch fabric mechanisms associated with a Maintenance Port. Typically, an RS-232 serial interface, or an RS-449 interface, or other such data socket mechanism is utilized, within the architecture of Class3 to Class 5 wireline and wireless telephony switches.

Figure 5:
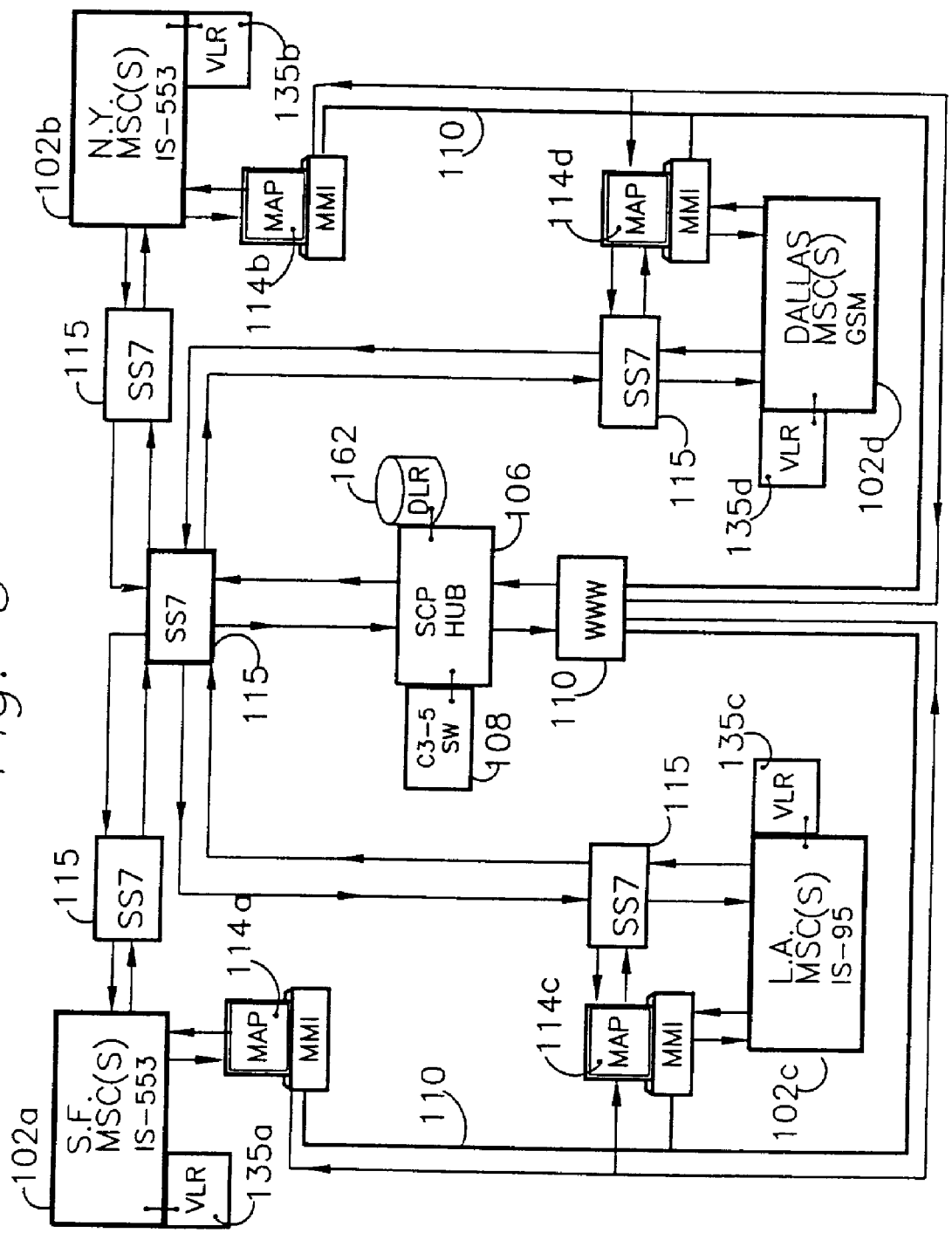
FIG. 5 is a block schematic of the preferred embodiment of the RTSC system interacting with multiple cellular Mobile Switching Centers, according to the invention.

The SCP-HUB contains network management subsystems. These subsystems consists of; databases that manage data packet traffic both, inbound and outbound. These databases create and send outbound pages, messages, commands and other essentials. The network subsystem also acts as gateways that cause format conversions between multi signaling and multi messaging standards. These databases also manage billing, user profiles, ASP profiles, data traffic and other operational statistics. The typical MSC switch is a Class 3 to a Class 5 switch. Many MSCs contain Class 4 Digital pulse code modulated (PCM) digital switches with a switch-matrix data bus rate of 1.544 MBPS, which is the same as T1 bandwidth. However, T1 and digital switch modulation schemes are incompatible, and a transMux signaling format conversion is required. The SCP-HUB 106 is connected to its own Class 3 to Class 5 telephony switch 108, as shown in FIG. 3, FIG. 4, and FIG. 5. The invention uses this switch for multiple tasking, application specific data-traffic routing, VLR QualDir entry updates, REGNOTs to VLRs, forward page MMI MAP terminal invokes, ASP message routing and other such operations.

Referring to FIG. 2, the MSC switch matrix 94 generally consists of circuits, and buses that are used to route voice and data traffic. The matrix is controlled by the CPU 77, which manages all switch systems and their individual functions. The matrix 94 connects to the MSC switch distribution frame 93, via switch fabric 92. The distribution frame consists of data link modems, controllers, and base site interfaces. Switch fabric typically consists of call processing subsystems, call routing and translation mechanisms, administration subsystems, maintenance subsystems, trunk management subsystems and other such telephony switch functional elements. There are four cellular and/or PCS base sites depicted here 101a, 101b, 101c and 101d, which are typically connected to the distribution frame via T1 DSO/DS1 data links. The MMI MAP terminal 114 is represented here in its most basic form. This computer has an in and out or 'I/0' bus 78, whereby input data is received from the SCP-HUB 106; its switch 108, DLR 162 and other functional entities. The I/O bus receives these specially formatted Qualification Directive packets, and other such instructional-command data packets 111. These data-packets are received via the input bus 96, and detected by the dialogic card firmware and software 91. Once detected, the card analyses the received packet and responds to specific instruction sets, and forwards the commands to the main data processing body of the terminal 89. The inventions specialized MAP software is activated 84, by received command or instruction sets contained within the data structures of the received modified data packet. Once activated, the MMI terminal reads the MIN fields and other related data, and causes a forward page to be created 88. Once created, the forward page packet is sent to the output bus 97, and maintenance port 98. The forward-channel page packet is then forwarded by the switch matrix 94, to the switch fabric 92, MSC distribution frame 93, and base sites 101a, 101b, 101c, and 101d. The MMI Map terminal also enables manual keyboard entries 90 while multitasking automatic MAP mode, thus allowing conventional MAP command tasking to occur 87 simultaneously. The invention provides optional functions 86, via its specialized software and firmware. These functions include; base site identification and mobile communicator velocity tracking, specialized switch bandwidth management, and specific forward base site channel management, that enable designated forward channel pages. Other specialized functions include custom call routing, base site component security, base site component testing, base site radio foot print testing, emergency 911 services, and other such functions.

Referring to FIG. 3, it shows the inventions means and methods operating in a large cellular or PCS telephony network 95. These networks typically consist of multiple MSCs and other network elements. Shown here are four MSCs with associated VLRs; MSC1 102a, VLR 135a, MSC2 102b, VLR 135b, MSC3 102c, VLR 135c and MSC4 102d, VLR 135d. Included are associated base sites 101a, 102b, 102c, and 102d, and operating application specific wireless data communicators 101a, 101b, 101c, and 101d. In this example associated base sites are configured differently, to reflect different capacity needs. Base site 101a is a six sector base site. Each sector has multiple voice traffic radios and one combined forward and reverse control channel radio with its assigned frequencies. Base site 101b is a three sector base site, 101c is a two sector base site, and 101d is a one sector base site, configured for low level voice and data traffic.

This large cellular, or PCS network also consist of a carrier network management center 117, with its own associated SS7 signaling transfer point (STP) 109a. Contained within the carrier network management center is a plurality of the invention's specially modified MMI MAP terminals 114. There is no essential difference in terms of how the invention operates in a large network, such as the one depicted here, or any other cellular or PCS network configured for any designated capacity or operational area. The SCP-HUB 106, its associated switch 108, STP 109b, DLR 162, and other related network elements operate essentially the same way regardless of the size. In some respects the larger networks are easier to upgrade. The inventions means and methods can effective in terms of the inventions equipment distribution, and implementation costs for large networks. One modified MMI MAP terminal can cause forward pages to occur in multiple associated MSCs. The specially modified data packets 111 are used in the same manner. For example, the Qualification Directive packet that causes a VLR user profile update 112 is sent to one or more VLRs 135a, 135b, 135c, and 135d. A specialized Registration Notification 139 (Regnot) packet can be sent from the SCP-HUB 106 to one or more MSCs 102a, 102b, 102c, and 102d. The REGNOT packet 139 can also be sent to one or more of the VLRs, 135a, 135b, 135c and 135d. This REGNOT packet can be sent to redirect a VLR profile or an MSC authentication profile, in the same way that the Qualification Directive 112 is used to invoke a VLR user profile update. The REGNOT is actually more flexible, for high volume data-traffic environments. The SCP-Hubs associated switch 108 and STP 109b can route REGNOTS to VLRs and MSCs under IS-41 guidelines via the SS7 network 116. A Qualification Directive cannot be routed to an MSC under IS-41 guidelines.

There is provided a special usage of an IS-41 Registration Cancellation 169 directive. The Registration Cancellation invoke can also be sent to an associated VLR represented by one or more of the VLRs depicted; 135a, 135b, 135c, and 135d. Once the associated VLR receives this invoke, the designated user profile is erased from the VLRs user profile memory. Instead of the using the Qualification Directive 112 that causes a removal of the user profile, the Registration Cancellation invoke 169 is used. Once the user profile is erased by the reception the cancellation invoke, the SCP-HUB sends a Registration Notification invoke 139 to the same VLR that previously received the cancellation command, via the associated SS7 network 116.

Contained within this Registration Notification is the secondary MIN and the same ESN number that was previously registered in the associated VLRs user profile database. The invention provides for the manipulation of Registration Cancellations and Registration Notifications. This manipulation means in no way interferes with the conventional usage's of SS7 networks and SS7 service control points (SCP) such as the VLR.

Each VLR is an associated SS7 network node with its own OPC and DPC that consists of a three character global code, and three character cluster code, and a three character node code. Each MSC switch, 102a, 102b, 102c, and 102d also have its own SS7 network OPC and DPC designations. The carrier network management center 117 can route pages, VLR updates, specialized Registration Notifications and other such actions via its SS7 network subsystem. The MMI MAP terminals that are interconnected to the SCP-HUB 106 via its associated STP 109b, SS7 data links 115, that interconnect with an associated public and private host SS7 network 116. The SCP-HUB is also connected to the ASP via the internet world wide web (WWW) 110.

Referring to FIG. 4, it depicts a cellular, and/or PCS and a mobile satellite network. The SCP-HUB 106 is interconnected to an MMI MAP terminal 114d, via its associated STP 109c, and an SS7 data link 115. This MMI MAP terminal 114d is colocated with a mobile-satellite network ground station 104, which controls a master satellite hub antenna 140. The ground station also has its own associated VLR 135d. The ground station communicates with a LEO or Geosynchronous satellite 107. This ground station can also support Very Small Aperture Terminal (VSAT) satellite networks. VSATs operate in analog and digital environments, configured as permanently assigned multiple access (PAMA) terminals and/or demand assigned multiple access (DAMA) terminals. The satellite can also communicate with a specialized application specific data communicator 100a, that is configured as a dual mode system. This communicator contains hardware, firmware and software means that enables data communications between cellular or PCS networks analog, digital control, and signaling air interface channels. The communicator also uses mobile satellite network space segment control, authentication side bands and signaling channels. The invention operates in the depicted satellite network in the same manner that it operates in a cellular or PCS network. The SCP-HUB 106 contains network management subsystem 105 that is comprised of a plurality of computer terminals and other databases.

Referring to FIG. 6, depicted here is a SCP-HUB 106 network center that is comprised of the aforementioned DLR 162, and its network management subsystem 105. The NMS subsystem 105 is comprised one or more computer terminals that contain databases that perform the following broad functions. The data reception and distribution terminal(s) 167 (DRD) receives and sends all data to designated ASP(s) 120. The decoder terminal 168 (DEC) decodes all incoming ASP data packets via the internet world wide web (WWW) 110. All incoming SS7 packets are sent to the DEC 168 via the DLR 162. The DEC 168 formats the received packets in accord with the standard format that is desired for use, for a particular application specific data-event. The comparative database 169 (CDB) contains user profiles, and ASP profiles. In addition, the CDB 169 also contains specific communicator status report records. These records are sent to ASPs. The CDB 169, also sends forward messaging and forward paging invokes to the action database terminal(s) 119 (ADB).

The ADB 119 prepares pages and messages in accord with the associated host network protocol. The ADB prepares action invokes to the DLR 162, or the associated SCP-HUB switch 108 as depicted in FIG. 3, FIG. 4, and FIG. 5. Referring to FIG. 6, the ADB receives user profiles from the CDB 169 and constructs the forward message in accord with the associated host network standards. The ADB can construct TCP/IP packets that contain forward pages and other MMI MAP terminal 114 instruction sets. The ADB also constructs the aforementioned IS-41-compatible packet protocols that can be sent from the ADB to any other SS7 network nodes. Or, the ADB can constructs packet that are sent to the DLR 162, whereby the DLR relays the specified packet to the VLR 135, MSC 102 or MMI MAP terminal network node 114 via SS7 data link 115. Additional IS-41 SS7 based packets that can be manipulated by the current invention include but are not limited to; Location Request, Routing Request, Remote Feature Control Request, Service Profile Request, Service Profile Directive, Transfer To Number Request, CCS Inactive, Redirection Request and Call Data Request. Each one these IS-41 automatic roaming packets can be manipulated, and reformatted to contain MMI Map terminal forward message or page invokes, and other MAP related instruction sets, VLR user profile redirects and MIN updates, MSC authentication data base user profile redirects and MIN updates. And many other important messaging actions. All of these aforementioned modifications can be enabled without circumventing any conventional host network operating standards.

Other important features of the invention include tracking mobile application specific communicators in a cellular and PCS host network environment. This is enabled by identifying the particular base site that is serving a particular application specific communicator. This feature also establishes time of access, and what type of data traffic it is producing. These means and methods are accomplished by simply identifying what switch bus or port the currently serving base site is assigned. When a status data-packet, is transmitted from an application data communicator passes through a designated switch bus. Because the geographic position of a cellular and PCS base site is always a known factor, establishing a general location of a designated communicator is a straight froward task. The invention accesses the means and methods billing record statistics provided by the cellular or PCS carrier in real time. This information is routed to the MMI MAP terminal via the Maintenance port and its access to switch fabric elements. These records typically contain base site access or control channel assignments, frequencies, base site data link port assignments and other related information. The invention provides for direct access to these records via its modified MMI MAP terminal firmware and software. The MMI MAP terminal gathers this information from the switch fabric, and enters this information in a modified IS-41 SS7 based Qualification Request data packet and sends back to the SCP-HUB via an SS7 data link.

Referring to FIG. 4, there is depicted the inventions SCP-HUB 106, its specialized switch 108 and other associated network elements. Three mobile application specific communicators 100a, 100b, and 100c are operating in a designated cellular network. There are multiple base sites 128, 129, 130, 131, 132 and 133. Each base site has one or more cellular radio sectors. Each sector represents a radio frequency group. Typically each sector is allocated from 16 or more full duplex voice traffic channels and one duplex control channel. Base sites 128, 129, 130 and 133 are three sector base sites. Base site 131 is a two sector base site and base site 132 is a single sector or Omni sector base site. There is depicted a data link 134. This data link representation suggests a single data link for one base site. In a real world cellular environment, each base site has its own data link means. In some cellular network configurations there will be multiple base sites connected to one T1/T3 physical connection. However T-carrier data links have a minimum of 24 DSO channels with a minimum data rate of 64 KBPS. One DSO or DS3 channel is assigned to one or more base sites, such as in an Omni cell with one sector, or a three sector cell with three DSO channels out of 24, or three DS3 channels out of 24. Each DS3 channel has a 44.736 Mbits per second data rate.

Each sector is assigned its own set of radio frequencies. Each assigned frequency is represented by symbols such as '4B' which for example symbolically represents the frequency assigned to base site 132, which has a single Omni sector, with a 360 degree foot print. Typically, each three sector cell has three cell antennas with a focal range of 120 degrees each such as the example of base site 128 with three set frequencies represented by '1B,' '3C,' and '4C.' Each sector covers a general geographic area. When a communicator is detected accessing and causing data traffic to occur in that sector, the information is transferred to the inventions MMI MAP Terminal via billing record statistics.

Figure 7:
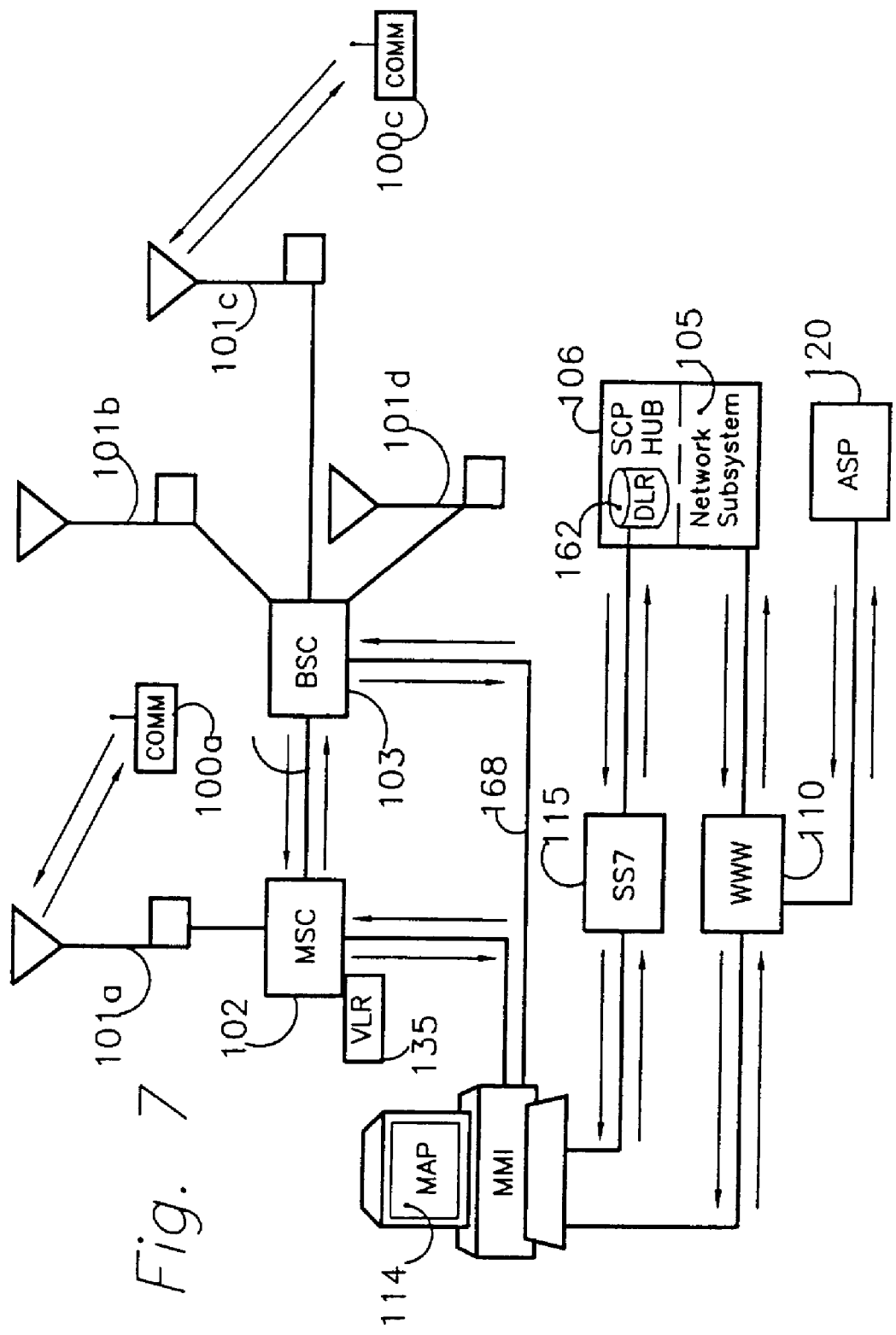
FIG. 7 is a block schematic of the RTSC protocol from the SCP-HUB to optional RTSC network elements, according to the invention.

When an application specific communicator is operating in a given base site coverage area it routinely transmits REGNOT packets as a result of its own internal program structures. Additionally the communicator transmits autonomous registrations triggered by it's own software. Registrations are also caused by REGNOT commands that are transmitted from the currently serving base site via its overhead forward control channels. In another scenario, each application specific communicator transmits its own application specific data packets. Every time an application specific data packet is received by a currently serving base site, it is automatically relayed to its associated MSC 102 via its base site controller 103 (BSC) as shown in FIG. 7. Referring to FIG. 4, and FIG. 7, each cellular base site typically has its own BSC. However in some PCS network configurations such as GSM PCS, multiple base sites 101b, 101c and 101d for example can be controlled by one central BSC 103, as shown in FIG. 7. In this case the BSC 103 acts as a mini switch. Whether the BSC control one base site or three, the BSC is connected to a T-carrier data link 168. In this case, each base site has its own assigned T-carrier channel. Each T-Carrier link is connected and assigned to a specific MSC switch port.

Referring to FIG. 2, the switch fabric 92 contains the switch buses or ports that interface with the switch matrix 94, and the base site distribution frame 93. In this example a 4×4 switch bus is shown for the purpose of brevity. In this instance, the 'W' bus 154 is assigned to the 'Z' bus 155. The bus carriers a status data packet that was transmitted by an application data communicator 100d. This communicator 100d is operating in the footprint area of base site 101d. The MMI MAP terminal 114 retrieves the billing statistics, and inserts this information in specially modified Qualification Request, Qualification Directive packet or some other specially formatted IS-41/SS7 compatible packet. This same information can be inserted in a TCP/IP data packet, and sent to the inventions SCP-HUB, via the internet world wide web (WWW) 110. An ATM network can be used, along with other dedicated or non dedicated data links.

Each switch port has a number recorded within switch fabric maintenance and billing software. Every time an application specific data packet passes from a specific base site, and its associated data link, the base site number, the T-Carrier channel number, designated port number, sector number and other pertinent data is recorded in the billing records. Referring to FIG. 7, the MMI Map terminal 114 receives this information from the MSC 102 or the BSC 103 depending upon host network configuration. The MMI Map terminal software records this information, creates a record, and enters it into a modified SS7 data packet such as the Qualification Request 121 depicted in FIG. 8. This billing data can be entered in some of the packets unused data spaces 136, 124, 125, and 126. The MMI MAP terminal 114 relays this information back to the inventions SCP-HUB via SS7 data links 115 or internet world wide web (WWW) 110. The associated DLR receives this information and relays it to the network subsystem 105. The network subsystem 105 can relay this billing information to a designated ASP 120 via the internet world wide web (WWW) 110.

The invention uses this billing information for other unique purposes. A currently serving base site is located in a specific base site location, and is connected to the MSC and BSC with specifically assigned T-carriers, port numbers and other details. Therefore this information can be used to establish a general location of the mobile application specific communicator. This information is used for anti-fraud purposes and emergency 911 services. In some cases an application specific communicator is combined with a Global Positioning Satellite (GPS) satellite receiver. However, various physical structures such as trees and buildings block signals, and therefore cannot be received. Additionally the nature of the application does not justify the use of a combined cellular, PCS, and GPS application specific communicator. Therefore obtaining a general location using the inventions means and methods will sufficiently surface.

Referring to FIG. 4, the inventions anti fraud feature is unique. For example one mobile communicator 100b has its own MIN and MSN. It transmits its REGNOT packets and application specific data packets. Each of these packets always contains the MIN and MSN information. If for example, the mobile communicator 100c is a cloned communicator. This communicator is operating illegally with a duplicate MIN and MSN that matches the authorized mobile communicator 100b. If the base site 130, where the cloned mobile communicator 100c is located twenty miles down range from base site 129, where mobile communicator 100b is operating the invention detects and reports the disparity. Both communicators have the same MIN/MSN combination. The inventions DLR 162 has specialized date and time stamp coding features that are entered in the application specific user profile record every time a packet passes through its internal data processing structures. The network management subsystem 105 maintains a mobile application specific system profile. The MMI MAP terminal 114b sends both the authorized mobile communicator 100b and the cloned communicator 100c information back to the SCP-HUB via the modified IS-41/SS7 Qualification Request packet, or by other modified IS-41 packet means. Each user profile is unique in that one communicator will not have same data transmission characteristics. For example, the authorized communicator has been operating in one base site for one hour. All of a sudden another communicator with the same MSN and ESN appears at a base site twenty miles down range. The Network Management Subsystem 105 detects the disparity and automatically shuts down both mobile application specific communicators. SCP-HUB personnel notify the host carrier, the associated application service provider (ASP) and contact law enforcement authorities.

Referring to FIG. 9, which is similar to the illustration in FIG. 8, however with one distinct difference. This packet is a Qualification Request 127. The internal parameters of this packet are essentially the same as the Qualification Directive packet in FIG. 8. The empty data fields 124, 125 and 126 can be used to send the aforementioned billing statistics to the SCP-HUB for, processing and determining mobile communicator positioning and tracking. The MMI MAP terminal reads this information from various switch elements that manage and control these billing statistics. This information is retrieved via the Maintenance Ports. The information is reformatted to conform to IS-41 SS7, TCP/IP or ATM protocols and relayed back to the SCP-HUB.

The invention also provides for the control and management of mobile application-specific communicators that are operating in multiple cellular network operational areas. This is especially valuable where one cellular or PCS footprint overlaps on another. This approach addresses the issue of specifically what network it will access, how and why. The invention provides remote control protocols on forward control channels that cause a designated communicator to switch from one cellular or PCS network to another. Additionally, the invention provides for automatic-detect algorithms that are contained within the firmware and software of the communicator itself. This feature causes the communicator to automatically switch to another cellular or PCS network, when access to one network is denied. This access denied acknowledgement is transmitted by the currently serving base site to the communicator on the overhead data stream of the forward control channels. This overhead denial parameter causes the application specific communicator to automatically switch to another cellular, PCS or mobile satellite network on a preferred basis without any further intervention from the SCP-HUB.

Referring to FIG. 12, depicted here is a status response data packet 157 formatted for an IS-553 AMPS analog cellular networks reverse control channel (RECC). This packet is comprised of seven 48 bit data words that are split up in three parts; the three word REGNOT part 143, the two word called address part 144, and the two word extended address part 145. During a Registration Notification (REGNOT), the three word REGNOT 143 part is transmitted by an application specific communicator. The A word 146, contains the primary MIN-421-1061, 141 which is the seven character portion of the MIN, along with other statistical and data management information. The B word 147 contains the number plan area (NPA) or area code 142, '175.' The guidelines set forth by the North American Number Plan specify certain important parameters. A 10 digit directory number, be it a wireline or wireless service number, is broken down in the following arrangement. The 10 digit directory number in its strictest interpretation, is composed in terms of this; NPA-NXX-XXXX format, in that all 'N' digits have a number range of 2 to 9 only. This 'N' feature is used for universal dialing purposes, and all the 'X' digits have a number range of 0 to 9. Another words a '0' or '1' inserted in the 'N' position cannot be dialed from a publicly switched telephone network (PSTN). Conversely, a cellular or PCS phone cannot access the PSTN network if a 100 to 199 NPA is dialed, or if any '1' or '0' is manually entered in an 'N' position during a conventional voice call attempt.

A '0' or '1' can be used by the present invention in the 'N' position of the ten digit directory number, for the aforementioned special routing, and important processes specific to communicator operations, and host network operations. The invention can exclusively use a '000,' as an NPA area code, or '000' NXX office code, or any combination where a '0' or '1' is inserted in the 'N' position. Therefore, the 100 to 199 range of NPAs and NXXs are exclusively used by the present invention for special MSC and associated switch analyses, and routing through an SS7 network. The special use of these 'N' digit combinations also enables a unique means of establishing application specific communicator identification. The manipulation of the 'N' digit of the MIN enables application specific unique application specific communicator operations. These unique operations are enabled when an access is attempted in any given cellular, PCS or mobile satellite host network.

Referring to FIG. 12, the C word 148 of the REGNOT part 143 contains the eight character Mobile Serial Number (MSN) 158 and used along with the MIN to identify and authenticate application specific communicators. This MSN is used by MSCs, and VLRs as part of the user profile databases endemic to these host network elements.

The 16 character called address part 144 of this application specific data packet is comprised of two eight character words, word 1 149, and word 2 150. These data words contain such application information 159 as Global Positioning System (GPS) longitude and latitude information. The data word can also include electrical meter status information, vending machine status and inventory information, and many other type of application specific information. This part of the packet is sent when an application specific communicator transmits this packet to a currently serving base site that is an associated network element of a host cellular or PCS network. The REGNOT part 143. and called address part 144, is always transmitted together during a specialized status data transmission event. In the U.S. most cellular base sites will only allow the REGNOT part and called address part to be transmitted together. However, new cellular and PCS specifications, called 'extended dialing,' enable additional data words to be transmitted by applications specific communicators. The third part of this application specific data packet is designated at the extended called address 145 that enable a total of 32 characters to be transmitted from an application specific communicator is one burst, or data event. This part is comprised two eight character words, word 3, 151 and word 4, 152. These words also contain application specific information 160.

Figure 11:
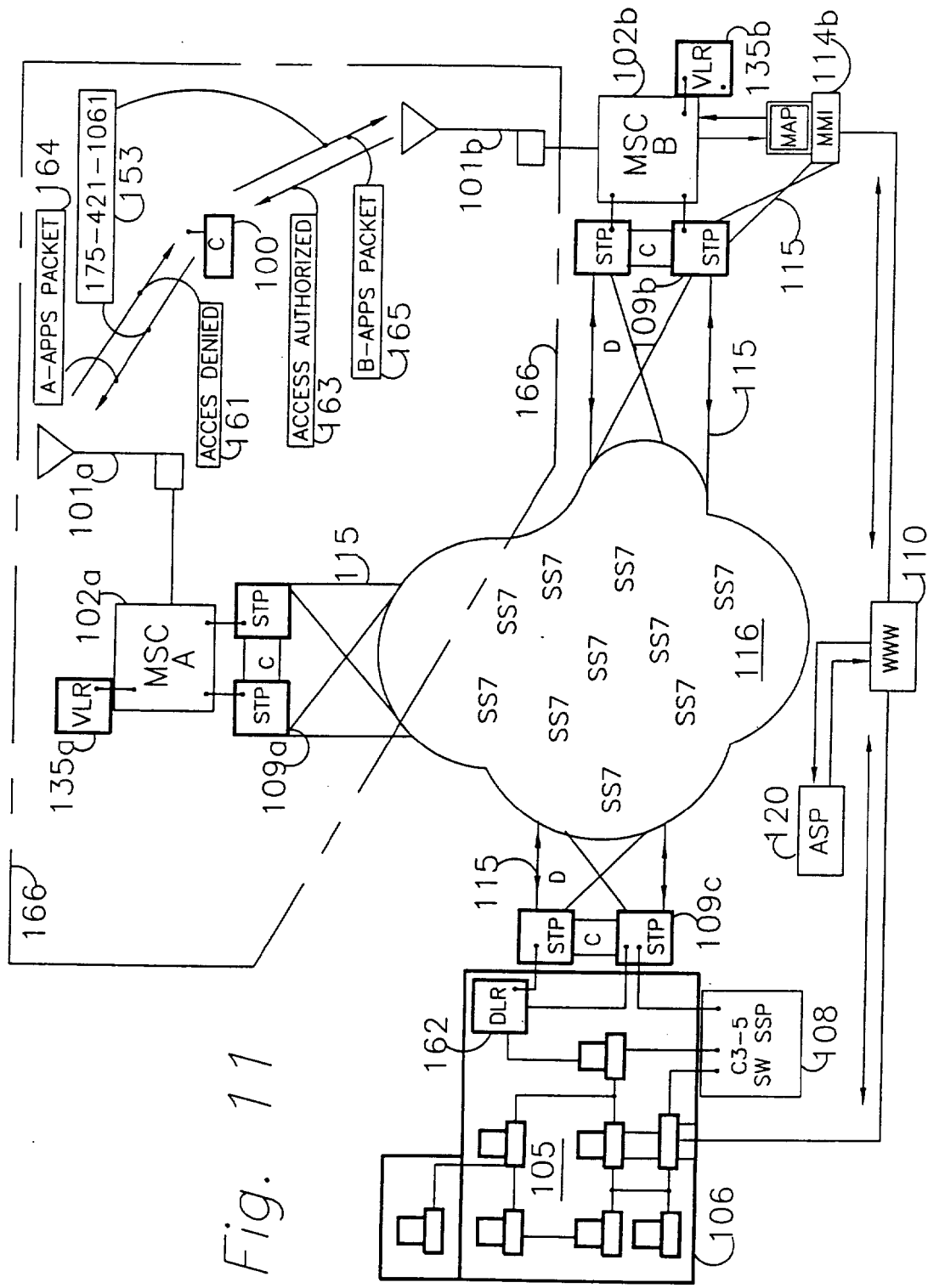
FIG. 11, is an illustration that depicts an example of the RTSC system controlling and application specific data communicator in a cellular A and B system, according to the invention.

Referring to FIG. 11, an application specific communicator 100 is operating is a designated Metropolitan Statistical Area (MSA) 166, also known as a Metropolitan Transactions Area (MTA). Each market or city has two cellular systems to maintain a duopoly market policy. The Federal Communications Commission mandated this policy in order to maintain a competitive environment in each city, or market. This particular MSA has two cellular carrers. The A side carrier is represented by MSC A 102a, base site 101a. However the A side carrier is not configured for application specific data communications over control channels, and its associated MSC and SS7 signaling network. Also the MSCs translations tables have not been configured to accept NPAs within the 100 to 199 number range. In this example, an application specific communicator is attempting access via an associated base site and MSC. First access is attempted on the A side. The communicator 100 transmits an application specific REGNOT packet 164, containing the MIN 153 to the A side's associated base site 101a. The base site 101a, relays the REGNOT packet 164 to the associated MSC 102a. The MSC 102a analyses the A, B and C word of the REGNOT part 143 of the packet as shown in FIG. 12. In FIG. 11, the MSC 102a checks the 175 NPA 142, compares it against the NPA translation table database list, discovers no match, and causes an access denied indicator to be sent to the currently serving base site. The forward control channel air interface link delivers the access denied indicator to the communicator attempting access 100. Next, the application specific communicator 100 receives the access denied indicator for the A side cellular carrier. Communicator software causes the integrated radio to scan the B side carriers control channel frequencies. The communicator and then transmits the REGNOT application specific data packet 165, containing the complete 10 digit MIN 153 that is embedded in the A and B word to the B side carriers currently serving base site.

The B side carrier is represented by the MSC 102b, base site 101b, and the inventions MMI MAP terminal 114b, and is configured to manage application specific data traffic within its network elements. Also, the B side's MSC and its associated switch translation tables have been configured to recognize and process MIN numbers with the NPA number range of 100 to 199. The invention exclusively uses this special number range, in order to effect its specialized, automatic preferred access processes and procedures. This aspect is further enabled for 100 to 199 NPA number ranges will never be used for conventional wireline or wireless voice services. The communicator transmits the packet to the closest currently serving B side base site 101b. The base site 101b relays the REGNOT packet 165, to the B side MSC 102b. The MSC 102b analyses the received REGNOT packet 165, compares the 175 NPA against the MIN number translation-table a database list. The MSC 102b determines that this is a valid MIN, and relays it to the associated VLR 135b. The associated VLR 135b then sends an IS-41 SS7 compatible Registration Notification to the associated DLR 162. The DLR is an associated network element that is co-located with the specialized application specific SCP-HUB 106. The DLR 162, checks its own user profile data base, examines the mobile serial number (MSN) contained in the C word 148 that is shown in FIG. 12, and determines that this particular Registration Notification packet with its contained MIN 153 belongs to a valid user. In FIG. 11, the DLR 162, sends an authorization notification to the currently serving MSC 102b and its associated VLR 135b. The VLR 135b authenticates the application specific communicator 100 and creates a new user profile VLR entry. The VLR 135b sends a registration or service authorization to the associated MSC 102b via the SS7 network 116. The MSC 102b then sends an access authorized indicator to the currently serving base site 101b via its dedicated data link. The associated base site 101b sends an access authorized indicator 163 to the application specific communicator 100, via its associated forward control channels. The communicator 100, then prepares to transmit application specific data packets to the currently serving B side carrier. The B side carrier then relays the application data packets to the inventions SCP-HUB 106 via its associated DLR 162.

The SCP-HUB and its associated MMI MAP Terminal 114b can cause an application specific communicator to switch between A side and B side carriers. Each application specific data communicator can contain a software program that causes the communicator to switch between A, B and C block cellular and PCS carriers, when triggered from an external radio source. This program is initiated when the communicator receives and detects a special command MIN originally sent from the SCP-HUB 106, its associated the MMI MAP terminal 114b, and its associated cellular, PCS or mobile satellite network. The DLR 162 maintains the aforementioned user profile that has currently serving host network location information. This unique forward paging feature causes application specific communicator internal algorithms to trigger a selection between A, or B, or C block cellular or PCS carriers. These same algorithms can cause the communicator to also select a mobile satellite network for service when appropriate.

Referring to FIG. 5, the invention can be utilized in numerous cellular and PCS operational areas. For example the San Francisco MSC 102a, its associated VLR 135a and MMI MAP terminal 114a, the New York MSC 102b with its associated VLR 135b and MMI MAP terminal 114b are configured to operate within IS-553 AMPS analog cellular standards. In another example the invention operates within IS-95 code division multiple access (CDMA) digital standards. The connected Los Angeles cellular markets MSC 102c and its associated VLR 135c, and MMI MAP terminal 114c are configured for IS-95. While the Dallas PCS network is configured for Global System for Mobile (GSM) time division multiple access (TDMA) digital cellular services. Each cellular or PCS operating area is joined by an SS7 network, and the inventions MMI Map terminals 114a, 114b, 114c and 114d are interconnected via SS7 data links SS7 or Internet world wide web (WW) data links. The SCP-HUB 106 and its associated switch 108 are configured to be compatible with these aforementioned cellar and PCS networks. Therefore the invention operates with complete flexibility.

Figure 10:
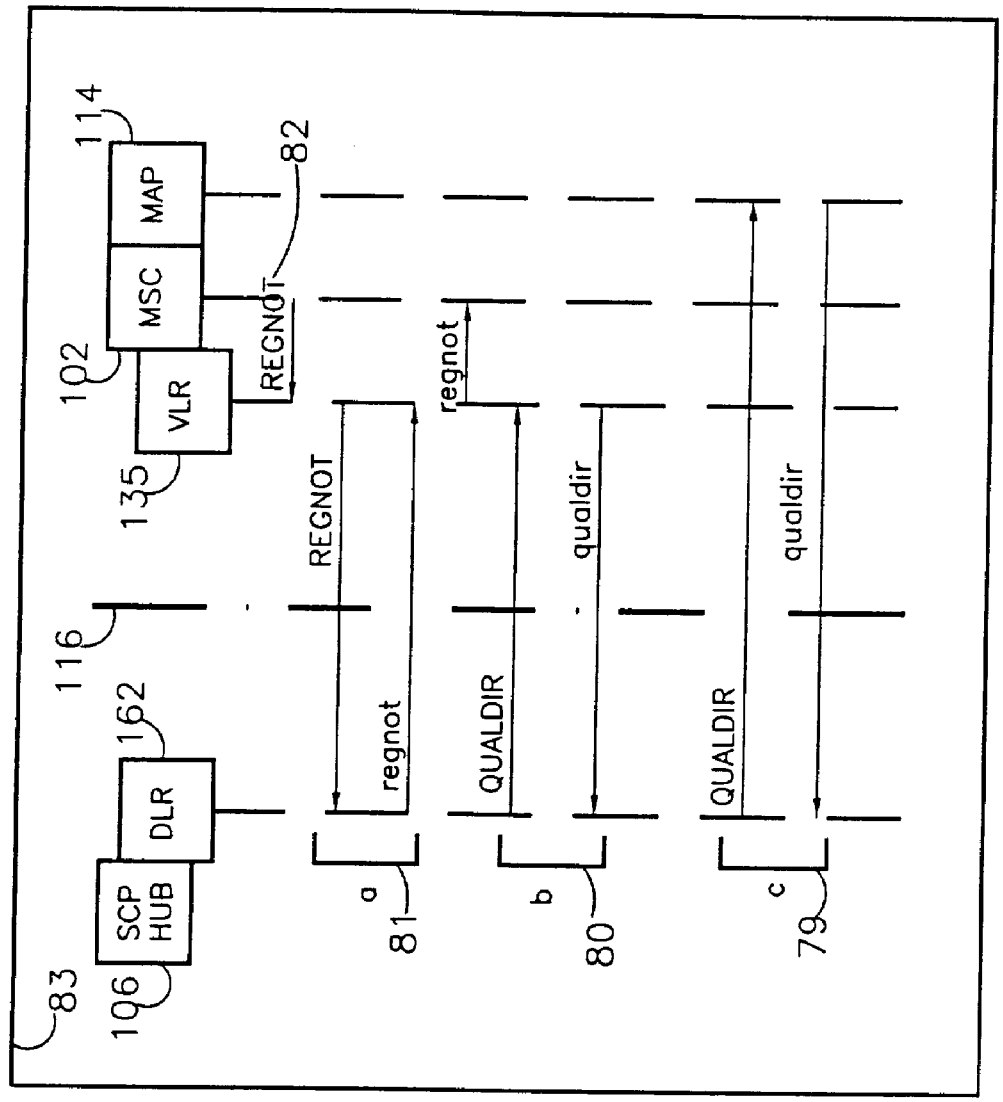
FIG. 10 is a block diagram that depicts an example of an SS7 IS-41, Registration, and Qualification Directive protocol event, according to the invention.

Referring to FIG. 10, this illustration depicts an IS-41 SS7 network entity model 83. The SCP-HUB 106 and its associated VLR 162 operates in the same network domain as a designated cellular, or PCS MSC 102, VLR 135, and MMI Map terminal 114. REGNOTs, registration notification invokes between MSCs 82 and VLRS 135, occur in the same manner whether the MSC and VLR are configured for any designated cellular or PCS operational standard. 'REGNOTs' invoke 82 represented in upper case letters are sent from any network entity for initial network element interrogation. REGNOT invokes, and registration notification responses represented by lower case 'regnots' always occur in pairs 81. In an SS7 environment, anytime a network entity receives any type of interrogation packet, it must respond with a result packet within three seconds. Total SS7 transaction completion occurs within six seconds. The inventions Qualification Directive, represented by 'QUALDIR' invoke, and its response 'qualdir' 80 sent from the inventions DLR 162 and to the serving systems VLR 135 represent a total six second duration. The same factor is true for the 'QUALDIR' invoke and the 'qualdir' response 79 between the inventions DLR 162 and the inventions MMI MAP terminal 114. The time lapse also occurs within a six second increment. All invokes and responses occur with the network environment of an public or private SS7 network 116 in the same manner. This example represents how stable the inventions MMI MAP terminal, and DLR interact with one another. This important aspect justifies the use of the robust operational character of IS-41 compatible SS7 networks.

May it also be noted that a stand-alone network node card can be used instead of a modified MMI MAP terminal. This card is essentially a single board computer that is connected to a Maintenance Port of the associated switch. The card is installed in an associated switch equipment rack The card contains the inventions modified MAP software. The card is also an SS7, internet, or ATM network point-of-presence. The card operates exactly in accord with the aforementioned MAP software processes and procedures.

The invention provides a complete bi-directional forward and reverse messaging means and methods that combines; manipulated caller I.D. application specific data information that is transmitted over the air interface of forward and reverse analog and digital control channels that are used in cellular, PCS and mobile satellite networks. The invention also provides for manipulation of caller I.D. information over the air interface of forward and reverse analog and digital voice or traffic channels that are used in cellular, PCS and mobile satellite networks. The invention also provides for the manipulation of caller I.D. data over PSTN trunks that are linked to modified premise equipment (MPE) at the inventions SCP-HUB. The inventions application specific communicators contain modified firmware and software that cause the unit to terminate the air interface link or call upon immediate completion of status reporting event. The communicator therefore enables the means and method of becoming modified terminal equipment (MTE).

The invention further manipulates cellular, PCS and mobile satellite 'call statistics' in a unique and innovative manner. Specifically, the invention manipulates 'incomplete calls' during the forward MPCD data message delivery, and 'drop calls' during the reverse status-response data message (SRDM) delivery. Caller I.D. standards use such abbreviations and acronyms as; calling name delivery (CNAM), calling number delivery (CND), customer premise equipment (CPE), frequency shift keying (FSK), multiple data message format (MDMF), visual message waiting indicator (MWI), open switch interval (OSI), and single data message format (SDMF). One important means and method of manipulating caller I.D. is to use this data as means of transporting application specific data transmission associated with the act of 'ringing' modified landline customer premise equipment (MCPE) will in 'on-hook status'.

The invention provides the means and method of delivering caller I.D. data to wireless application specific communicators. When the application specific communicator is in 'idle' status, the invention invokes a forward MPCD data event. When the communicator is paged it 'rings' in the same way a landline CPE does. During the 'pause' state between rings, the invention provides the means and method delivering application specific data from the SCP-HUB, the PSTN, the associated MSC, the associated base site and finally to the modified terminal equipment (MTE) integrated within the circuitry structure of the application specific communicator. When a conventional mobile radio is being paged, the associated MSC and base site has previously assigned a forward and reverse voice channel to that radio. When the user picks up the handset and presses the send button, the voice channels are quickly initialized, SAT tone is retrieved from the forward channel and 'fed back' to the base site on the reverse channel and thus the billing cycle commences.

The invention provides the means of delivering the application specific data message in modified caller I.D. data bits to the invention communicator over the forward voice channel during the 'pause state' between the first 'ring' and the second 'ring.' Once the communicator detects message reception, it automatically terminates the 'call' and releases the forward and reverse voice or traffic channels. The data is therefore delivered, the MSC records a 'dropped call' statistic. Total forward network bandwidth usage is minimized. This MPCD data event duration impact the entire network between 500 milliseconds to 1.8 seconds.

This dropped call statistic contains the communicator's MIN number which in this case is a number that has the inventions 100–199 NPA or area code. Because of this unique number, the MSC is able to 'filter' the distinct data of this dropped call statistic, and use it to count the forward packet traffic of the inventions RTSC system and services. Even if the inventions SCP-HUB network system elements malfunction and lose forward and reverse packet count, the MSC will always have an accurate count of forward and reverse application data packet delivery.

The invention provides for unique delivery of reverse messaging. For example, when the communicator receives an MPCD forward message it terminates the event in the described manner. However, when the application specific communicator initializes a reverse caller I.D. message. Referring to FIG. 2, the communicator 100*d* reads the status of the integrated application specific device (ASD) 214 and initializes and transmits a modified Remote Feature Access Control packet that contains modified dialed digits, and caller I.D. data bits 172*b*. During the transmission of a Remote Feature Access Control packet the MSC typically assigns forward and reverse voice channels. These channels are assigned or reserved for up 1.8 seconds. However the invention is designed to maximize associated network bandwidth. Therefore as soon as the RECC data packet is transmitted and received at the associated base site, it releases the 'call' within 500 milliseconds.

This modified Remote Feature Access Control packet is transmitted over the associated RECC analog control channel provided by the associated base site 101*d*, and relayed to the MSC 102. Once the communicator radio transmits the packet on the RECC, it immediately awaits 'idle status' that is transmitted over the FOCC forward analog control channel within the FOCC filler data. This 'idle' status indicates to the communicator that the transmitted data packet has arrived successfully at the serving base site. Once this is accomplished, the communicator releases the call within 500 milliseconds. The MSC records this call event as a 'dropped call.' This action in no way impacts the currently serving cellular network adversely. On the contrary this method maximizes the efficiency of the RTSC system.

The invention also provides for 'dropped call' counts because of the use of 175 NPA during the reverse event. The MSC analyses the packets contained MIN number with its 175 NPA and forwards it to the SCP-HUB 106 via an SS7 link 115. The 175 NPA is equated with the DLR's 162 SS7 based destination point code (DPC). The MSC 102 uses this point code to route the packet to the DLR 162 via the associated SS7 network. This packet can contain both caller I.D. data bits and conventional dialed digits, or contain one or the other separately.

Another means and method of transmitting application data information via manipulation of caller I.D. bit sent over reverse voice channels. The communicator 100*d* simply places a conventional 'call' by transmitting an 'origination data packet' over the RECC reverse control channel. Once this is completed, the MSC 102 cause the associated base site 101d to assign a forward and reverse voice channel. The MSC 102 analyses the dialed digits via means and methods known to those skilled in the art and sends the 'call' via the PSTN 171 to the SCP-HUBs 106 modified premise equipment (MPE) 212. The MPE is specially modified terminal equipment that receive thousands of 'calls' within a very short time duration. When the 'call' or data message containing the 10 digit MIN with the 175 MIN or any other 100–199 range NPA, reaches the MPE it in display mode, it terminates the 'call' and relays the MIN belonging to the communicator 100d to the SCP-HUBs NMS subsystem. Attached to the MIN is a modified 15 to 21 byte caller I.D. message that is used in conventional means as a 'calling party name.' However the invention utilizes this 'manipulated calling party name' message as an application specific message. This message contains application specific communicator and application specific device status response bits.

This modified 'calling party name' message can contain such data as global positioning system (GPS) longitude and latitude location information, electoral power meter readout bits, motor vehicle status bits, vending machine inventory status, security system status reporting bits and other such information. However since the MPE 212 did not 'pick up' the call before going off-hook, the MSC records the event as an 'incomplete call.' The MSC use the Incomplete Call Statistics (ICS) 215 for counting 'data packet-process records' associated with dropped calls initiated by reverse messages sent by communicators that have appended 100–199 NPA based MIN numbers. As soon as the communicator 100d detects the first 'ring' on the assigned forward voice and delivers the caller I.D. message it releases the call. The MSC 102 records an 'incomplete call.'

Referring to FIG. 2 and FIG. 4, the same again is true for MPCD forward data packets configured either for conventional paging protocols or modified caller I.D. bits. The SCP-HUB 106 initializes the MPCD forward data event by causing the MPE 212 to dial the application specific communicator 100b, using the TLDN and SS7 manipulation heretofore described. The MPE sends a 'call' via the associated SCP-HUB switch 108 and or the LTN switch 170. Contained within this 'call' is a modified 'calling party name' or forward message 195, that in actuallity provides 15 to 21 bytes of application specific data over the PSTN 171. The MSC 102 receives the call, and routes the call to the base site 129 associated with the communicator 100b and delivers the message in the heretofore described manner. In FIG. 2, the communicator 100d is configured the same as communicator 100b. The communicator receives call and the MTE 213 portion of the communicator terminates the call within 500 milliseconds.

Figure 16:
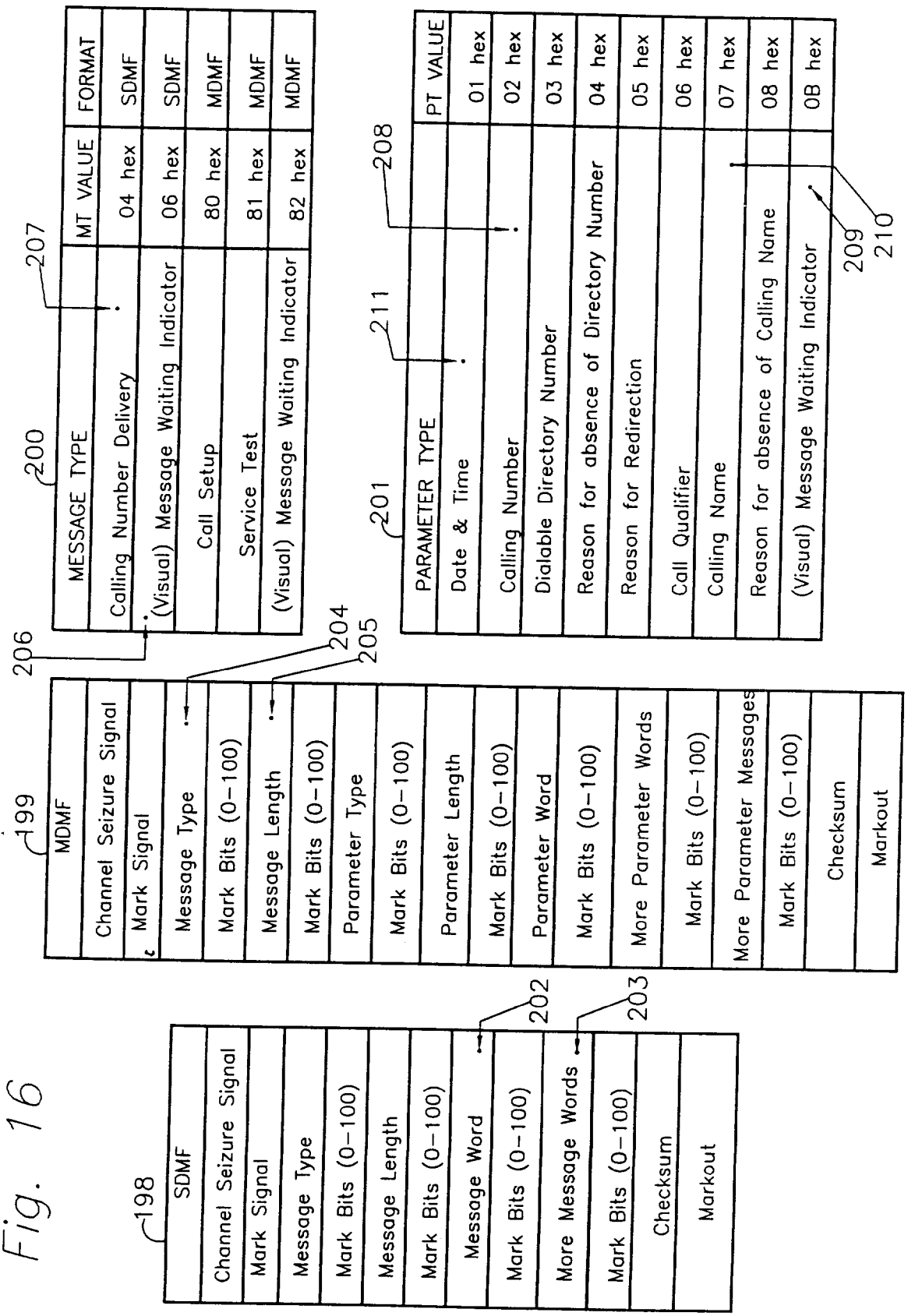
FIG. 16, depicts Caller I.D. manipulated word formats, parameter types and message types according to the invention.

Referring to FIG. 16, depicted here are examples of different caller I.D. related data messages, message indicators, parameters, and parameter types. The SDMF parameter block 198 shows the format for single data message formats. This format is used to send modified and manipulated 'calling name' 210, message waiting indicator (MWI) 209 as shown the in the parameter type example 201. The 'calling name' 210 and MWI 209 is contained in the message word 202 increment and the 'more message words' increment 203 as shown in the SDMF 198 example. The SDMF example 198 is used for 'on-hook' caller I.D. data delivery. This 'on-hook' status insures the need to maintain 'incomplete calls' and 'drop calls.' The invention uses the 'on-hook' status of wireless and wireline terminal equipment in order that the RTSC system and service does not incur cellular, PCS or mobile satellite air time charges. In addition, the invention uses the 'on-hook' status of the terminal equipment insures that there are no PSTN long distance charges. The invention uses only milliseconds of air-time and PSTN during reverse and forward manipulated caller I.D. data.

The RTSC system delivers forward and reverse application specific data packets at a fraction of the cost of services that depend on extensive PSTN and wireless network infrastructure buildout and modifications.

Referring to FIG. 16, the invention manipulates calling numbers 207 listed in this message type 200 example. In the parameter type example 201, 'date & time' 211 caller I.D. information is manipulated to send application specific messages. This 'date & time' information is also used to insure that the invention application specific communicators maintain the proper internal time structures. This feature is important, certain application specific communicators are designed to transmits application specific status response packets at certain times of the day, week or month. The SCP-HUB can therefore send application specific data packets that contain 'date & time' information to designated application specific communicators. This delivery can be accomplished in a point-to-point means and method or point-to-omni point broadcast means. When the communicators receive the 'date & time' caller I.D. information, they record the information and if necessary reset the communicator and/or application specific device. This 'date & time' information is conventionally used to simply indicate to a user the proper time and date. The invention uses this conventional feature in a completely innovative means and method.

In FIG. 16, the Multiple Data Message Format example 199 is used for 'off-hook' caller I.D. data delivery to application specific communicators. The message type increment 205 and message length 205 are used to govern message formats. MDMF caller I.D. words can be sent bi-directionally from communicator to SCP-HUB and visa versa while the communicator is transmitted or receiving data. This is especially important for the support of delivering application specific command data, or status response data for the inventions special communicators that are designed to support circuit switched voice services in addition to the data only services. Therefore MDMF caller I.D. messages can be sent the inventions communicators that support circuit switched cellular, PCS or mobile satellite voice services.

Referring to FIG. 2, the invention provides a complete bi-directional application specific data service that requires no additional infrastructure elements, or host network system software changes. The inventions innovative means and methods only require special SCP-HUB 106, DLR 162, MPE 212 configurations on the data management end of this 'network within a network.' The inventions innovative means and methods only require specially configured and designed communicators 100d, internal modified terminal equipment (MTE) 213, and application specific devices 214 on the wireless data end. The host associated network need only to 'reinterpret' the 'meaning of the incomplete call statistics (ICS) 215, and dropped call statistics (DCS) 216.

Referring to FIG. 4, the inventions means and methods will operate within any wireless and wireline network that supports conventional caller I.D. services. The invention can deliver manipulated caller I.D. data via cellular, PCS and mobile satellite analog and digital control channels, and analog and digital traffic channels. All of this data is managed by the inventions SCP-HUB 106. The SCP-HUB 106 serves as gateway to multiple application service providers (ASP) 120 via the internet world wide web (WWW) 110. The inventions manipulated CID 172 information is supported by analog cellular base sites 128, 130, 131, 132, and 133 that support extended forward control channel (FOCC) protocols, and extended reverse control channel (RECC) protocols. The inventions manipulated CID 172 information is supported by digital cellular base sites 129 that are configured for IS-95 CDMA 197 services, or IS-136 TDMA 196 services. The inventions manipulated caller I.D. RTSC system, fully supports application specific mobile satellite services via a satellite 107, a satellite compatible communicator 100a, and its associated ground station (GS) 104.

Another important aspect of the invention is its unique means and method of manipulating IS-553 AMPS cellular system access. When the invention's application specific communicator attempts access, and transmits its modified and manipulated Remote Feature Access Control packet, the following processes and procedures apply. When an application specific communicator transmits this modified packet as shown in FIG. 12, the serving base site detects the packet, and analyses its 'order code' and 'order qualifier' code 217 contained in the B word 147. A conventional Remote Feature Access Control packet is just another form of 'origination,' or request for voice service. According to IS-553 specifications, the order '0000' contained in B word causes the base site and MSC Upon reception of the packet, the base site relays the packet to the associated MSC. The MSC 'orders' the assignment of reservation of forward and reverse voice or traffic channels. This 'reservation scheme' momentarily allocates voice channel bandwidth and then releases these channels. This reservation time increment lasts between 1.8 to 3.3 seconds. For the purposes of the invention and its applications, this reservation duration is not acceptable. The invention uses this packet to transport application specific information in its dialed digit stream, words 149, 150, 151 and 152 as shown in FIG. 12. Since invention does not use voice or traffic channels for this type of data transaction, another modification to the communicator's firmware is necessary. This modification causes a unique manipulation of the voice channel assignment task. As a result of this innovative manipulation, the application specific communicator never occupies a cellular, PCS or mobile satellite voice channel.

Figure 17:
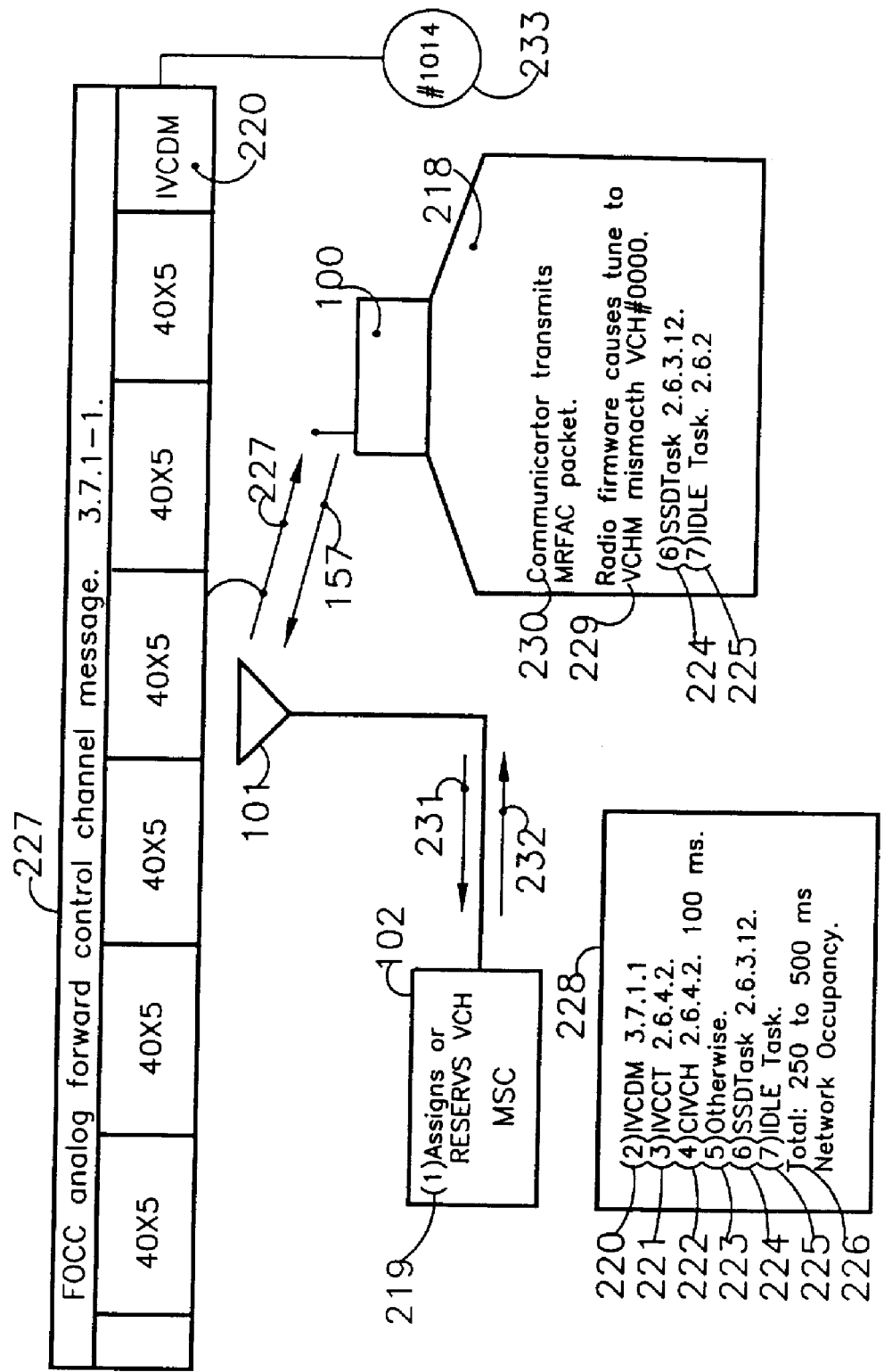
FIG. 17, depicts a manipulated IS-553 AMPS mobile radio to base site access, according to the invention.

Referring to FIG. 17, The invention's communicator 100 transmits a Modified Remote Feature Access Control packet (MRFAC) 157 to the currently serving base site 101. The base site 101 analyses the received packet, identifies it as an 'origination' and forwards it 231 to the serving MSC 102. The MSC 102 identifies the packet as a MRFAC 157 as shown in FIG. 12. The MSC 102, assigns or reserves voice channels 219 by sending the assignment order 232 to the serving base site 101. The base site 101 transmits an FOCC forward control message 227 to the application specific communicator 100. Contained within this message is an Initial Voice Channel Designation Message (IVCDM) 220 as specified by certain IS-553 AMPS land-to-mobile and mobile-to-land intercommunications standards 228 section 3.7.1.1.

The communicator 100 and its firmware 218 respond to the reception of the IVCDM 220 with the following procedures. The invention causes the radio firmware 218 to respond to the IVCDM 220 with a designed voice or traffic channel mismatch (VCHM) 229. This VCHM acts in the same way as if a conventional mobile station that is set to a preferred system such as the A side, and tries to access and match a voice channel on the B side. In this case, there would be no match. The invention manipulates this procedure in a completely acceptable way. The firmware modification or patch causes the communicator's radio to always react to the IVCDM message 220 with an intentional mismatch. This action insures that the communicator 100 never occupies a voice or traffic channel in any way. Furthermore, this action occurs entirely within the confines of internal firmware and software structures and in no way effects the cellular, PCS or mobile satellite that is serving the application specific communicator. The invention manipulates the standard within its structures, however the cellular system that serves the communicator is in no way effected. In fact the serving cellular system 'sees' this manipulated event as a 'dropped call' or an 'incomplete call,' based on a failure of the radio to match The cellular system 'sees' this event as a failure of the radio to match the IVCDM 220 message invoke. This failure occurs as a result of the radio not tuning to a designated voice channel number #1014 contained in the received FOCC message 233. The mismatch 229 that contains a 'non-channel' response; VCH#0000 causes the base site 101 to wait for the communicator radio to match for 100 milliseconds. Once the 100 ms time expires, the base site completes the event and releases all tasks and reports a an incomplete call statistic (ICS) 215 or a dropped call statistic (DCS) 216 to the associated MSC 102 as shown in FIG. 2.

Referring to FIG. 17, during base site's 100 ms event timer expiration, the radios firmware 218 causes the communicator to either go to serving system determination (SSD) task 224 as shown in the IS-553 specification 2.6.3.12, 228 and within the radio itself 218. The SSD task 224 is initialized only if the radio wants to access another serving cellular, PCS ort mobile satellite system. If not, as in this case, the radio goes to standby or 'idle task' 225 as specified in IS-553 228. In this way, the MRFAC 157 data transmission event occupies the currently serving network between 250 ms to 500 ms 226 maximum.

Additional objects and advantages will readily occur to those skilled in the art. Therefore, the invention in its broader aspects is not limited to the specific details, methods, representative devices, and illustrative examples shown and described. Accordingly, departures may be made from such details with departing from the spirit or scope of the general inventive concept as defined by the appended claims and their equivalents.

What is claimed is:

1. A method of communicating a command from a central host to a remote station via a cellular mobile radio network, comprising:

a) sending the command from the central host to a network switch, the command comprising a mobile identification number (MIN) and an electronic serial number (ESN);

b) querying a database associated with the network switch to locate the remote station, the query specifying the MIN and the ESN;

c) if the database associated with the network switch does not locate the remote station on the basis of the MIN and ESN, then:

1) reporting the location of the remote station to the database associated with the network switch, the report specifying the MIN and ESN;

2) reporting to a database associated with a mobile switching center (MSC) serving a remote station identified by the ESN that the remote station is no longer being served by the MSC, the report specifying the ESN;

3) reporting the location of the remote station to the database associated with the MSC serving the remote station, the report specifying the MIN and ESN;

4) acknowledging to the database associated with the network switch receipt of the report on the location of the remote station, the report specifying the MIN and ESN; and 5) sending the command by calling the remote station using the MIN and ESN.

2. The method of claim 1, wherein sending the command from the host to a network switch, the command comprising a mobile identification number (MIN) and electronic serial number (ESN), comprises sending the command from the host to a network switch via a public switched telephone network, the command comprising a MIN and ESN.

3. The method of claim 2, wherein sending the command from the host to a network switch, the command comprising a MIN and ESN, comprises sending the command from the host to a signaling system 7 (SS7) service switching point (SSP) via a public switched telephone network, the command comprising a MIN and ESN.

4. The method of claim 2, wherein sending the command from the host to a network switch, the command comprising a MIN and ESN, comprises sending the command from the host to a signaling system 7 (SS7) service switching point (SSP) via a local area network, the command comprising a MIN and ESN.

5. The method of claim 2, wherein sending the command from the host to a network switch, the command comprising a MIN and ESN, comprises sending the command from the host to a signaling system 7 (SS7) service switching point (SSP) via a Transport Control Protocol/Internet Protocol (TCP/IP) based-internetwork, the command comprising a MIN and ESN.

6. The method of claim 2, wherein querying a database associated with the network switch to locate the remote station, the query specifying the MIN and ESN, comprises querying a Home Location Register (HLR) associated with the SS7 SSP to locate the remote station, the query specifying the MIN and ESN.

7. The method of claim 6, wherein querying a HLR associated with the SS7 SSP to locate the remote station, the query specifying the MIN and ESN, comprises sending a location request invoke (LOCREQ) from the SS7 SSP to the HLR to locate the remote station, the query specifying the MIN and ESN.

8. The method of claim 7, wherein reporting the location of the remote station to the database associated with the network switch if the database associated with the network switch does not locate the remote station on the basis of the MIN and ESN, the report specifying the MIN and ESN, comprises the SS7 SSP reporting the location of the remote station to the HLR if the HLR does not locate the remote station on the basis of the MIN and ESN, the report specifying the MIN and ESN.

9. The method of claim 8, wherein the SS7 SSP reporting the location of the remote station to the HLR if the HLR does not locate the remote station on the basis of the MIN and ESN, the report specifying the MIN and ESN, comprises sending a registration notification invoke (REGNOT) from the SS7 SSP to the HLR if the HLR does not locate the remote station on the basis of the MIN and ESN, the REGNOT specifying the MIN and ESN.

10. The method of claim 9, wherein reporting to a database associated with a MSC serving a remote station identified by the ESN that the remote station is no longer being served by the MSC if the database associated with the network switch does not locate the remote station on the basis of the MIN and ESN, the report specifying the ESN, comprises the HLR reporting to a visitor location register (VLR) associated with a MSC serving a remote station identified by the ESN that the remote station is no longer being served by the MSC if the HLR does not locate the remote station on the basis of the MIN and ESN, the report specifying the ESN.

11. The method of claim 9, wherein reporting to a database associated with a MSC serving a remote station identified by the ESN that the remote station is no longer being served by the MSC if the database associated with the network switch does not locate the remote station on the basis of the MIN and ESN, the report specifying the ESN, comprises the SSP reporting to a visitor location register (VLR) associated with a MSC serving a remote station identified by the ESN that the remote station is no longer being served by the MSC if the HLR does not locate the remote station on the basis of the MIN and ESN, the report specifying the ESN.

12. The method of claim 10, wherein the HLR reporting to a VLR associated with a MSC serving a remote station identified by the ESN that the remote station is no longer being served by the MSC if the HLR does not locate the remote station on the basis of the MIN and ESN, the report specifying the ESN, comprises the HLR sending a registration cancellation invoke (REGCANC) to a VLR associated with a MSC serving a remote station identified by the ESN, the REGCANC indicating that the remote station is no longer being served by the MSC if the HLR does not locate the remote station on the basis of the MIN and ESN, the REGCANC specifying the ESN.

13. The method of claim 11, wherein the SSP reporting to a VLR associated with a MSC serving a remote station identified by the ESN that the remote station is no longer being served by the MSC if the HLR does not locate the remote station on the basis of the MIN and ESN, the report specifying the ESN, comprises the SSP sending a registration cancellation invoke (REGCANC) to a VLR associated with a MSC serving a remote station identified by the ESN, the REGCANC indicating that the remote station is no longer being served by the MSC if the HLR does not locate the remote station on the basis of the MIN and ESN, the REGCANC specifying the ESN.

14. The method of claim 13, wherein reporting the location of the remote station to the database associated with the MSC serving the remote station, the report specifying the MIN and ESN, comprises the SSP reporting the location of the remote station to the VLR associated with the MSC serving the remote station, the report specifying the MIN and ESN.

15. The method of claim 14, wherein the SSP reporting the location of the remote station to the VLR associated with the MSC serving the remote station, the report specifying the MIN and ESN, comprises the HLR sending a REGNOT indicating the location of the remote station to the VLR associated with the MSC serving the remote station, the REGNOT specifying the MIN and ESN.

16. The method of claim 15, wherein acknowledging to the database associated with the network switch receipt of the report on the location of the remote station, the report specifying the MIN and ESN, comprises the VLR acknowledging receipt of the report on the location of the remote station to the HLR, the report specifying the MIN and ESN.

17. The method of claim 16, wherein the VLR acknowledging receipt of the report on the location of the remote station to the HLR, the report specifying the MIN and ESN, comprises the VLR sending a registration notification response to the HLR confirming the REGNOT, the registration notification response specifying the MIN and ESN.

18. The method of claim 17, wherein calling the remote station using the MIN and ESN comprises calling the remote station in accordance with cellular radiotelecommunications intersystem operations as set forth in Telecommunications Industry Association/Electronics Industry Association Interim Standard 41 (TIA/EIA IS41).

19. A method of communicating commands from a central host to remote stations via a cellular mobile radio network, comprising:
  a) sending a command from the central host to a network switch, the command comprising a profile, wherein the profile sets forth call capabilities;
  b) querying a database associated with the network switch to identify a remote station in the cellular mobile radio network having call capabilities matching the profile;
  c) if the database associated with the network switch does not identify a remote station having call capabilities that match the profile, then:
    1) reporting the profile to the database associated with the network switch;
    2) reporting to a database associated with a mobile switching center (MSC) serving a remote station whose call capabilities match selected call capabilities set forth in the profile that the remote station is no longer being served by the MSC;
    3) reporting the profile to the database associated with the MSC serving the remote station;
    4) acknowledging to the database associated with the network switch receipt of the report on the profile; and
    5) sending the command by calling the remote station using the profile.

* * * * *